US011933324B2

(12) United States Patent
Cooper

(10) Patent No.: US 11,933,324 B2
(45) Date of Patent: Mar. 19, 2024

(54) MOLTEN METAL ROTOR WITH HARDENED BLADE TIPS

(71) Applicant: Molten Metal Equipment Innovations, LLC, Middlefield, OH (US)

(72) Inventor: Paul V. Cooper, Chesterland, OH (US)

(73) Assignee: Molten Metal Equipment Innovations, LLC, Middlefield, OH (US)

( * ) Notice: Subject to any disclaimer, the term of this patent is extended or adjusted under 35 U.S.C. 154(b) by 0 days.

(21) Appl. No.: 17/200,785

(22) Filed: Mar. 13, 2021

(65) Prior Publication Data

US 2021/0199115 A1 Jul. 1, 2021

Related U.S. Application Data

(63) Continuation of application No. 15/013,879, filed on Feb. 2, 2016, now Pat. No. 10,947,980.

(Continued)

(51) Int. Cl.

| | |
|---|---|
| ***F04D 7/06*** | (2006.01) |
| ***F04D 29/02*** | (2006.01) |
| ***F04D 29/046*** | (2006.01) |
| ***F04D 29/22*** | (2006.01) |
| ***F04D 29/24*** | (2006.01) |

(52) U.S. Cl.

CPC ........... *F04D 7/065* (2013.01); *F04D 29/026* (2013.01); *F04D 29/2294* (2013.01); *F04D 29/24* (2013.01); *F04D 29/0465* (2013.01); *F05D 2230/41* (2013.01); *F05D 2240/303* (2013.01); *F05D 2240/307* (2013.01); *F05D 2300/224* (2013.01); *F05D 2300/506* (2013.01)

(58) Field of Classification Search

CPC .... F04D 7/065; F04D 29/026; F04D 29/0465; F04D 29/2294; F04D 29/24; F04D 29/2288; F04D 29/2227; F05D 2240/303; F05D 2240/307; F05D 2300/224; F05D 2300/506; F05D 2230/41; F27D 27/005; F27D 3/14

See application file for complete search history.

(56) References Cited

U.S. PATENT DOCUMENTS

| | | | |
|---|---|---|---|
| 35,604 | A | 6/1862 | Guild |
| 116,797 | A | 7/1871 | Barnhart |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

"Response to Final Office Action and Request for Continued Examination for U.S. Appl. No. 09/275,627," including Declarations of Haynes and Johnson, dated Apr. 16, 2001.

(Continued)

*Primary Examiner* — Topaz L. Elliott
*Assistant Examiner* — Jesse M Prager
(74) *Attorney, Agent, or Firm* — SNELL & WILMER L.L.P.

(57) ABSTRACT

Embodiments of the invention are directed to a rotor for use in molten metal and devices including the rotor. The rotor has a rotor body and blades, wherein each blade includes a tip that is at least twice as hard as the rotor body.

20 Claims, 13 Drawing Sheets

Related U.S. Application Data

(60) Provisional application No. 62/110,899, filed on Feb. 2, 2015.

(56) References Cited

U.S. PATENT DOCUMENTS

| | | | |
|---|---|---|---|
| 209,219 | A | 10/1878 | Bookwalter |
| 251,104 | A | 12/1881 | Finch |
| 307,845 | A | 11/1884 | Curtis |
| 364,804 | A | 6/1887 | Cole |
| 390,319 | A | 10/1888 | Thomson |
| 495,760 | A | 4/1893 | Seitz |
| 506,572 | A | 10/1893 | Wagener |
| 585,188 | A | 6/1897 | Davis |
| 757,932 | A | 4/1904 | Jones |
| 882,477 | A | 3/1908 | Neumann |
| 882,478 | A | 3/1908 | Neumann |
| 890,319 | A | 6/1908 | Wells |
| 898,499 | A | 9/1908 | O'Donnell |
| 909,774 | A | 1/1909 | Flora |
| 919,194 | A | 4/1909 | Livingston |
| 1,037,659 | A | 9/1912 | Rembert |
| 1,100,475 | A | 6/1914 | Franckaerts |
| 1,170,512 | A | 2/1916 | Chapman |
| 1,196,758 | A | 9/1916 | Blair |
| 1,304,068 | A | 5/1919 | Krogh |
| 1,331,997 | A | 2/1920 | Neal |
| 1,185,314 | A | 3/1920 | London |
| 1,377,101 | A | 5/1921 | Sparling |
| 1,380,798 | A | 6/1921 | Hansen et al. |
| 1,439,365 | A | 12/1922 | Hazell |
| 1,454,967 | A | 5/1923 | Gill |
| 1,470,607 | A | 10/1923 | Hazell |
| 1,513,875 | A | 11/1924 | Wilke |
| 1,518,501 | A | 12/1924 | Gill |
| 1,522,765 | A | 1/1925 | Wilke |
| 1,526,851 | A | 2/1925 | Hall |
| 1,669,668 | A | 5/1928 | Marshall |
| 1,673,594 | A | 6/1928 | Schmidt |
| 1,697,202 | A | 1/1929 | Nagle |
| 1,717,969 | A | 6/1929 | Goodner |
| 1,718,396 | A | 6/1929 | Wheeler |
| 1,896,201 | A | 2/1933 | Sterner-Rainer |
| 1,988,875 | A | 1/1935 | Saborio |
| 2,013,455 | A | 9/1935 | Baxter |
| 2,035,282 | A | 3/1936 | Schmeller, Sr. |
| 2,038,221 | A | 4/1936 | Kagi |
| 2,075,633 | A | 3/1937 | Anderegg |
| 2,090,162 | A | 8/1937 | Tighe |
| 2,091,677 | A | 8/1937 | Fredericks |
| 2,138,814 | A | 12/1938 | Bressler |
| 2,173,377 | A | 9/1939 | Schultz, Jr. et al. |
| 2,264,740 | A | 12/1941 | Brown |
| 2,280,979 | A | 4/1942 | Rocke |
| 2,290,961 | A | 7/1942 | Heuer |
| 2,300,688 | A | 11/1942 | Nagle |
| 2,304,849 | A | 12/1942 | Ruthman |
| 2,368,962 | A | 2/1945 | Blom |
| 2,383,424 | A | 8/1945 | Stepanoff |
| 2,423,655 | A | 7/1947 | Mars et al. |
| 2,488,447 | A | 11/1949 | Tangen et al. |
| 2,493,467 | A | 1/1950 | Sunnen |
| 2,515,097 | A | 7/1950 | Schryber |
| 2,515,478 | A | 7/1950 | Tooley et al. |
| 2,528,208 | A | 10/1950 | Bonsack et al. |
| 2,528,210 | A | 10/1950 | Stewart |
| 2,543,633 | A | 2/1951 | Lamphere |
| 2,566,892 | A | 4/1951 | Jacobs |
| 2,625,720 | A | 1/1953 | Ross |
| 2,626,086 | A | 1/1953 | Forrest |
| 2,676,279 | A | 4/1954 | Wilson |
| 2,677,609 | A | 4/1954 | Moore et al. |
| 2,698,583 | A | 1/1955 | House et al. |
| 2,714,354 | A | 8/1955 | Farrand |
| 2,762,095 | A | 9/1956 | Pemetzrieder |
| 2,768,587 | A | 10/1956 | Corneil |
| 2,775,348 | A | 12/1956 | Williams |
| 2,779,574 | A | 1/1957 | Schneider |
| 2,787,873 | A | 4/1957 | Hadley |
| 2,808,782 | A | 10/1957 | Thompson et al. |
| 2,809,107 | A | 10/1957 | Russell |
| 2,821,472 | A | 1/1958 | Peterson et al. |
| 2,824,520 | A | 2/1958 | Bartels |
| 2,832,292 | A | 4/1958 | Edwards |
| 2,839,006 | A | 6/1958 | Mayo |
| 2,853,019 | A | 9/1958 | Thornton |
| 2,865,295 | A | 12/1958 | Nikolaus |
| 2,865,618 | A | 12/1958 | Abell |
| 2,868,132 | A | 1/1959 | Rittershofer |
| 2,901,006 | A | 8/1959 | Andrews |
| 2,901,677 | A | 8/1959 | Chessman et al. |
| 2,906,632 | A | 9/1959 | Nickerson |
| 2,918,876 | A | 12/1959 | Howe |
| 2,948,524 | A | 8/1960 | Sweeney et al. |
| 2,958,293 | A | 11/1960 | Pray, Jr. |
| 2,966,345 | A | 12/1960 | Burgoon et al. |
| 2,966,381 | A | 12/1960 | Menzel |
| 2,978,885 | A | 4/1961 | Davison |
| 2,984,524 | A | 5/1961 | Franzen |
| 2,987,885 | A | 6/1961 | Hodge |
| 3,010,402 | A | 11/1961 | King |
| 3,015,190 | A | 1/1962 | Arbeit |
| 3,039,864 | A | 6/1962 | Hess |
| 3,044,408 | A | 7/1962 | Mellott |
| 3,048,384 | A | 8/1962 | Sweeney et al. |
| 3,070,393 | A | 12/1962 | Silverberg et al. |
| 3,092,030 | A | 6/1963 | Wunder |
| 3,099,870 | A | 8/1963 | Seeler |
| 3,128,327 | A | 4/1964 | Upton |
| 3,130,678 | A | 4/1964 | Chenault |
| 3,130,679 | A | 4/1964 | Sence |
| 3,151,565 | A | 10/1964 | Albertson et al. |
| 3,171,357 | A | 3/1965 | Egger |
| 3,172,850 | A | 3/1965 | Englesberg et al. |
| 3,203,182 | A | 8/1965 | Pohl |
| 3,227,547 | A | 1/1966 | Szekely |
| 3,244,109 | A | 4/1966 | Barske |
| 3,251,676 | A | 5/1966 | Johnson |
| 3,255,702 | A | 6/1966 | Gehrm |
| 3,258,283 | A | 6/1966 | Winberg et al. |
| 3,272,619 | A | 9/1966 | Sweeney et al. |
| 3,289,473 | A | 12/1966 | Louda |
| 3,291,473 | A | 12/1966 | Sweeney et al. |
| 3,368,805 | A | 2/1968 | Davey et al. |
| 3,374,943 | A | 3/1968 | Cervenka |
| 3,400,923 | A | 9/1968 | Howie et al. |
| 3,417,929 | A | 12/1968 | Secrest et al. |
| 3,432,336 | A | 3/1969 | Langrod et al. |
| 3,459,133 | A | 8/1969 | Scheffler |
| 3,459,346 | A | 8/1969 | Tinnes |
| 3,477,383 | A | 11/1969 | Rawson et al. |
| 3,487,805 | A | 1/1970 | Satterthwaite |
| 3,512,762 | A | 5/1970 | Umbricht |
| 3,512,788 | A | 5/1970 | Kilbane |
| 3,532,445 | A | 10/1970 | Scheffler et al. |
| 3,561,885 | A | 2/1971 | Lake |
| 3,575,525 | A | 4/1971 | Fox et al. |
| 3,581,767 | A | 6/1971 | Jackson |
| 3,612,715 | A | 10/1971 | Yedidiah |
| 3,618,917 | A | 11/1971 | Fredrikson et al. |
| 3,620,716 | A | 11/1971 | Hess |
| 3,650,730 | A | 3/1972 | Derham et al. |
| 3,689,048 | A | 9/1972 | Foulard et al. |
| 3,715,112 | A | 2/1973 | Carbonnel |
| 3,732,032 | A | 5/1973 | Daneel |
| 3,737,304 | A | 6/1973 | Blayden et al. |
| 3,737,305 | A | 6/1973 | Blayden et al. |
| 3,743,263 | A | 7/1973 | Szekely |
| 3,743,500 | A | 7/1973 | Foulard et al. |
| 3,753,690 | A | 8/1973 | Emley et al. |
| 3,759,628 | A | 9/1973 | Kempf |
| 3,759,635 | A | 9/1973 | Carter et al. |
| 3,767,382 | A | 10/1973 | Bruno et al. |
| 3,776,660 | A | 12/1973 | Anderson et al. |
| 3,785,632 | A | 1/1974 | Kraemer et al. |

(56) References Cited

U.S. PATENT DOCUMENTS 3,787,143 A 1/1974 Carbonnel et al.
3,799,522 A 3/1974 Brant et al.
3,799,523 A 3/1974 Seki
3,807,708 A 4/1974 Jones
3,814,400 A 6/1974 Seki
3,824,028 A 7/1974 Zenkner et al.
3,824,042 A 7/1974 Barnes et al.
3,836,280 A 9/1974 Koch
3,839,019 A 10/1974 Bruno et al.
3,844,972 A 10/1974 Tully, Jr. et al.
3,871,872 A 3/1975 Downing et al.
3,873,073 A 3/1975 Baum et al.
3,873,305 A 3/1975 Claxton et al.
3,881,039 A 4/1975 Baldieri et al.
3,886,992 A 6/1975 Maas et al.
3,915,594 A 10/1975 Nesseth
3,915,694 A 10/1975 Ando
3,935,003 A 1/1976 Steinke et al.
3,941,588 A 3/1976 Dremann
3,941,589 A 3/1976 Norman et al.
3,942,473 A 3/1976 Chodash
3,954,134 A 5/1976 Maas et al.
3,958,979 A 5/1976 Valdo
3,958,981 A 5/1976 Forberg et al.
3,961,778 A 6/1976 Carbonnel et al.
3,966,456 A 6/1976 Ellenbaum et al.
3,967,286 A 6/1976 Andersson et al.
3,972,709 A 8/1976 Chin et al.
3,973,871 A 8/1976 Hance
3,984,234 A 10/1976 Claxton et al.
3,985,000 A 10/1976 Hartz
3,997,336 A 12/1976 van Linden et al.
4,003,560 A 1/1977 Carbonnel
4,008,884 A 2/1977 Fitzpatrick et al.
4,018,598 A 4/1977 Markus
4,043,146 A 8/1977 Stegherr et al.
4,052,199 A 10/1977 Mangalick
4,055,390 A 10/1977 Young
4,063,849 A 12/1977 Modianos
4,068,965 A 1/1978 Lichti
4,073,606 A 2/1978 Eller
4,091,970 A 5/1978 Komiyama et al.
4,119,141 A 10/1978 Thut et al.
4,125,146 A 11/1978 Muller
4,126,360 A 11/1978 Miller et al.
4,128,415 A 12/1978 van Linden et al.
4,147,474 A 4/1979 Heimdal et al.
4,169,584 A 10/1979 Mangalick
4,191,486 A 3/1980 Pelton
4,213,742 A 7/1980 Henshaw
4,242,039 A 12/1980 Villard et al.
4,244,423 A 1/1981 Thut et al.
4,286,985 A 9/1981 van Linden et al.
4,305,214 A 12/1981 Hurst
4,322,245 A 3/1982 Claxton
4,338,062 A 7/1982 Neal
4,347,041 A 8/1982 Cooper
4,351,514 A 9/1982 Koch
4,355,789 A 10/1982 Dolzhenkov et al.
4,356,940 A 11/1982 Ansorge
4,360,314 A 11/1982 Pennell
4,370,096 A 1/1983 Church
4,372,541 A 2/1983 Bocourt et al.
4,375,937 A 3/1983 Cooper
4,389,159 A 6/1983 Sarvanne
4,392,888 A 7/1983 Eckert et al.
4,410,299 A 10/1983 Shimoyama
4,419,049 A 12/1983 Gerboth et al.
4,456,424 A 6/1984 Araoka
4,470,846 A 9/1984 Dube
4,474,315 A 10/1984 Gilbert et al.
4,496,393 A 1/1985 Lustenberger
4,504,392 A 3/1985 Groteke
4,509,979 A 4/1985 Bauer
4,530,641 A 7/1985 Gschwender
4,537,624 A 8/1985 Tenhover et al.
4,537,625 A 8/1985 Tenhover et al.
4,545,887 A 10/1985 Amesen
4,556,419 A 12/1985 Otsuka et al.
4,557,766 A 12/1985 Tenhover et al.
4,586,845 A 5/1986 Morris
4,592,700 A 6/1986 Toguchi et al.
4,594,052 A 6/1986 Niskanen
4,596,510 A 6/1986 Arneth et al.
4,598,899 A 7/1986 Cooper
4,600,222 A 7/1986 Appling
4,607,825 A 8/1986 Briolle et al.
4,609,442 A 9/1986 Tenhover et al.
4,611,790 A 9/1986 Otsuka et al.
4,617,232 A 10/1986 Chandler et al.
4,634,105 A 1/1987 Withers et al.
4,640,666 A 2/1987 Sodergard
4,655,610 A 4/1987 Al-Jaroudi
4,668,166 A 5/1987 Lutz
4,669,953 A 6/1987 Gechwender
4,673,434 A 6/1987 Withers et al.
4,682,585 A 7/1987 Hiltebrandt
4,684,281 A 8/1987 Patterson
4,685,822 A 8/1987 Pelton
4,696,703 A 9/1987 Henderson et al.
4,701,226 A 10/1987 Henderson et al.
4,702,768 A 10/1987 Areauz et al.
4,714,371 A 12/1987 Cuse
4,717,540 A 1/1988 McRae et al.
4,739,974 A 4/1988 Mordue
4,741,664 A 5/1988 Olmstead
4,743,428 A 5/1988 McRae et al.
4,747,583 A 5/1988 Gordon et al.
4,767,230 A 8/1988 Leas, Jr.
4,770,701 A 9/1988 Henderson et al.
4,786,230 A 11/1988 Thut
4,802,656 A 2/1989 Hudault et al.
4,804,168 A 2/1989 Otsuka et al.
4,810,314 A 3/1989 Henderson et al.
4,822,473 A 4/1989 Arnesen
4,834,573 A 5/1989 Asano et al.
4,842,227 A 6/1989 Harrington et al.
4,844,425 A 7/1989 Piras et al.
4,851,296 A 7/1989 Tenhover et al.
4,854,834 A 8/1989 Gschwender et al.
4,859,413 A 8/1989 Harris et al.
4,860,819 A 8/1989 Moscoe et al.
4,867,638 A 9/1989 Handtmann et al.
4,884,786 A 12/1989 Gillespie
4,898,367 A 2/1990 Cooper
4,908,060 A 3/1990 Duenkelmann
4,909,704 A 3/1990 Lutz
4,911,726 A 3/1990 Warkentin
4,923,770 A 5/1990 Grasselli et al.
4,930,986 A 6/1990 Cooper
4,931,091 A 6/1990 Waite et al.
4,940,214 A 7/1990 Gillespie
4,940,384 A 7/1990 Amra et al.
4,954,167 A 9/1990 Cooper
4,967,827 A 11/1990 Campbell
4,973,433 A 11/1990 Gilbert et al.
4,986,736 A 1/1991 Kajiwara et al.
4,989,736 A 2/1991 Andersson et al.
5,015,518 A 5/1991 Sasaki et al.
5,025,198 A 6/1991 Mordue et al.
5,028,211 A 7/1991 Mordue et al.
5,029,821 A 7/1991 Bar-on et al.
5,058,654 A 10/1991 Simmons
5,078,572 A 1/1992 Amra et al.
5,080,715 A 1/1992 Provencher et al.
5,083,753 A 1/1992 Soofi
5,088,893 A 2/1992 Gilbert et al.
5,092,821 A 3/1992 Gilbert et al.
5,098,134 A 3/1992 Monckton
5,099,554 A 3/1992 Cooper
5,114,312 A 5/1992 Stanislao
5,126,047 A 6/1992 Martin et al.
5,131,632 A 7/1992 Olson
5,135,202 A 8/1992 Yamashita et al.

(56) References Cited

U.S. PATENT DOCUMENTS 5,143,357 A 9/1992 Gilbert et al.
5,145,322 A 9/1992 Senior, Jr. et al.
5,152,631 A 10/1992 Bauer
5,154,652 A 10/1992 Ecklesdafer
5,158,440 A 10/1992 Cooper et al.
5,162,858 A 11/1992 Shoji et al.
5,165,858 A 11/1992 Gilbert et al.
5,177,304 A 1/1993 Nagel
5,191,154 A 3/1993 Nagel
5,192,193 A 3/1993 Cooper et al.
5,202,100 A 4/1993 Nagel et al.
5,203,681 A 4/1993 Cooper
5,209,641 A 5/1993 Hoglund et al.
5,215,448 A 6/1993 Cooper
5,268,020 A 12/1993 Claxton
5,286,163 A 2/1994 Amra et al.
5,298,233 A 3/1994 Nagel
5,301,620 A 4/1994 Nagel et al.
5,303,903 A 4/1994 Butler et al.
5,308,045 A 5/1994 Cooper
5,310,412 A 5/1994 Gilbert et al.
5,318,360 A 6/1994 Langer et al.
5,322,547 A 6/1994 Nagel et al.
5,324,341 A 6/1994 Nagel et al.
5,330,328 A 7/1994 Cooper
5,354,940 A 10/1994 Nagel
5,358,549 A 10/1994 Nagel et al.
5,358,697 A 10/1994 Nagel
5,364,078 A 11/1994 Pelton
5,369,063 A 11/1994 Gee et al.
5,383,651 A 1/1995 Blasen
5,388,633 A 2/1995 Mercer, II et al.
5,395,405 A 3/1995 Nagel et al.
5,399,074 A 3/1995 Nose et al.
5,407,294 A 4/1995 Giannini
5,411,240 A 5/1995 Rapp et al.
5,425,410 A 6/1995 Reynolds
5,431,551 A 7/1995 Aquino et al.
5,435,982 A 7/1995 Wilkinson
5,436,210 A 7/1995 Wilkinson et al.
5,443,572 A 8/1995 Wilkinson et al.
5,454,423 A 10/1995 Tsuchida et al.
5,468,280 A 11/1995 Areaux
5,470,201 A 11/1995 Gilbert et al.
5,484,265 A 1/1996 Horvath et al.
5,489,734 A 2/1996 Nagel et al.
5,491,279 A 2/1996 Robert et al.
5,494,382 A 2/1996 Kloppers
5,495,746 A 3/1996 Sigworth
5,505,143 A 4/1996 Nagel
5,505,435 A 4/1996 Laszlo
5,509,791 A 4/1996 Turner
5,511,766 A 4/1996 Vassilicos
5,520,422 A 5/1996 Friedrich
5,537,940 A 7/1996 Nagel et al.
5,543,558 A 8/1996 Nagel et al.
5,555,822 A 9/1996 Loewen et al.
5,558,501 A 9/1996 Wang et al.
5,558,505 A 9/1996 Mordue et al.
5,571,486 A 11/1996 Robert et al.
5,585,532 A 12/1996 Nagel
5,586,863 A 12/1996 Gilbert et al.
5,591,243 A 1/1997 Colussi et al.
5,597,289 A 1/1997 Thut
5,613,245 A 3/1997 Robert
5,616,167 A 4/1997 Eckert
5,622,481 A 4/1997 Thut
5,629,464 A 5/1997 Bach et al.
5,634,770 A 6/1997 Gilbert et al.
5,640,706 A 6/1997 Nagel et al.
5,640,707 A 6/1997 Nagel et al.
5,640,709 A 6/1997 Nagel et al.
5,655,849 A 8/1997 McEwen et al.
5,660,614 A 8/1997 Waite et al.
5,662,725 A 9/1997 Cooper
5,676,520 A 10/1997 Thut
5,678,244 A 10/1997 Shaw et al.
5,678,807 A 10/1997 Cooper
5,679,132 A 10/1997 Rauenzahn et al.
5,685,701 A 11/1997 Chandler et al.
5,690,888 A 11/1997 Robert
5,695,732 A 12/1997 Sparks et al.
5,716,195 A 2/1998 Thut
5,717,149 A 2/1998 Nagel et al.
5,718,416 A 2/1998 Flisakowski et al.
5,735,668 A 4/1998 Klein
5,735,935 A 4/1998 Areaux
5,741,422 A 4/1998 Eichenmiller et al.
5,744,093 A 4/1998 Davis
5,744,117 A 4/1998 Wilkinson et al.
5,745,861 A 4/1998 Bell et al.
5,755,847 A 5/1998 Quayle
5,758,712 A 6/1998 Pederson
5,772,324 A 6/1998 Falk
5,776,420 A 7/1998 Nagel
5,785,494 A 7/1998 Vild et al.
5,842,832 A 12/1998 Thut
5,846,481 A 12/1998 Tilak
5,858,059 A 1/1999 Abramovich et al.
5,863,314 A 1/1999 Morando
5,866,095 A 2/1999 McGeever et al.
5,875,385 A 2/1999 Stephenson et al.
5,935,528 A 8/1999 Stephenson et al.
5,944,496 A 8/1999 Cooper
5,947,705 A 9/1999 Mordue et al.
5,948,352 A 9/1999 Jagt et al.
5,951,243 A 9/1999 Cooper
5,961,285 A 10/1999 Meneice et al.
5,963,580 A 10/1999 Eckert
5,992,230 A 11/1999 Scarpa et al.
5,993,726 A 11/1999 Huang
5,993,728 A 11/1999 Vild
6,007,313 A 12/1999 Siegel
6,019,576 A 2/2000 Thut
6,027,685 A 2/2000 Cooper
6,036,745 A 3/2000 Gilbert et al.
6,074,455 A 6/2000 van Linden et al.
6,082,965 A 7/2000 Morando
6,093,000 A * 7/2000 Cooper ................. F01C 21/106
417/423.15
6,096,109 A 8/2000 Nagel et al.
6,113,154 A 9/2000 Thut
6,123,523 A 9/2000 Cooper
6,152,691 A 11/2000 Thut
6,168,753 B1 1/2001 Morando
6,187,096 B1 2/2001 Thut
6,199,836 B1 3/2001 Rexford et al.
6,217,823 B1 4/2001 Vild et al.
6,231,639 B1 5/2001 Eichenmiller
6,250,881 B1 6/2001 Mordue et al.
6,254,340 B1 7/2001 Vild et al.
6,270,717 B1 8/2001 Tremblay et al.
6,280,157 B1 8/2001 Cooper
6,293,759 B1 9/2001 Thut
6,303,074 B1 10/2001 Cooper
6,345,964 B1 2/2002 Cooper
6,354,796 B1 3/2002 Morando
6,358,467 B1 3/2002 Mordue
6,364,930 B1 4/2002 Kos
6,371,723 B1 4/2002 Grant et al.
6,398,525 B1 6/2002 Cooper
6,439,860 B1 8/2002 Greer
6,451,247 B1 9/2002 Mordue et al.
6,457,940 B1 10/2002 Lehman
6,457,950 B1 10/2002 Cooper et al.
6,464,458 B2 10/2002 Vild et al.
6,474,962 B1 11/2002 Allen et al.
6,495,948 B1 12/2002 Garrett, III
6,497,559 B1 12/2002 Grant
6,500,228 B1 12/2002 Klingensmith et al.
6,503,292 B2 1/2003 Klingensmith et al.
6,524,066 B2 2/2003 Thut
6,533,535 B2 3/2003 Thut
6,551,060 B2 4/2003 Mordue et al.

(56) References Cited

U.S. PATENT DOCUMENTS

| | | | |
|---|---|---|---|
| 6,562,286 | B1 | 5/2003 | Lehman |
| 6,656,415 | B2 | 12/2003 | Kos |
| 6,679,936 | B2 | 1/2004 | Quackenbush |
| 6,689,310 | B1 * | 2/2004 | Cooper .................... F27D 3/16 266/217 |
| 6,709,234 | B2 | 3/2004 | Gilbert et al. |
| 6,716,147 | B1 | 4/2004 | Hinkle et al. |
| 6,723,276 | B1 | 4/2004 | Cooper |
| 6,805,834 | B2 | 10/2004 | Thut |
| 6,843,640 | B2 | 1/2005 | Mordue et al. |
| 6,848,497 | B2 | 2/2005 | Sale et al. |
| 6,869,271 | B2 | 3/2005 | Gilbert et al. |
| 6,869,564 | B2 | 3/2005 | Gilbert et al. |
| 6,881,030 | B2 | 4/2005 | Thut |
| 6,887,424 | B2 | 5/2005 | Ohno et al. |
| 6,887,425 | B2 | 5/2005 | Mordue et al. |
| 6,902,696 | B2 | 6/2005 | Klingensmith et al. |
| 7,037,462 | B2 | 5/2006 | Klingensmith et al. |
| 7,074,361 | B2 | 7/2006 | Carolla et al. |
| 7,083,758 | B2 | 8/2006 | Tremblay |
| 7,131,482 | B2 | 11/2006 | Vincent et al. |
| 7,157,043 | B2 | 1/2007 | Neff |
| 7,204,954 | B2 | 4/2007 | Mizuno |
| 7,273,582 | B2 | 9/2007 | Mordue |
| 7,279,128 | B2 | 10/2007 | Kennedy et al. |
| 7,326,028 | B2 | 2/2008 | Morando |
| 7,402,276 | B2 | 7/2008 | Cooper |
| 7,470,392 | B2 | 12/2008 | Cooper |
| 7,476,357 | B2 | 1/2009 | Thut |
| 7,481,966 | B2 | 1/2009 | Mizuno |
| 7,497,988 | B2 | 3/2009 | Thut |
| 7,507,365 | B2 | 3/2009 | Thut |
| 7,507,367 | B2 | 3/2009 | Cooper |
| 7,543,605 | B1 | 6/2009 | Morando |
| 7,731,891 | B2 | 6/2010 | Cooper |
| 7,771,171 | B2 | 8/2010 | Mohr |
| 7,841,379 | B1 | 11/2010 | Evans |
| 7,896,617 | B1 | 3/2011 | Morando |
| 7,906,068 | B2 | 3/2011 | Cooper |
| 8,075,837 | B2 | 12/2011 | Cooper |
| 8,110,141 | B2 | 2/2012 | Cooper |
| 8,137,023 | B2 | 3/2012 | Greer |
| 8,142,145 | B2 | 3/2012 | Thut |
| 8,178,037 | B2 | 5/2012 | Cooper |
| 8,328,540 | B2 | 12/2012 | Wang |
| 8,333,921 | B2 | 12/2012 | Thut |
| 8,337,746 | B2 | 12/2012 | Cooper |
| 8,361,379 | B2 | 1/2013 | Cooper |
| 8,366,993 | B2 | 2/2013 | Cooper |
| 8,409,495 | B2 | 4/2013 | Cooper |
| 8,440,135 | B2 | 5/2013 | Cooper |
| 8,444,911 | B2 | 5/2013 | Cooper |
| 8,449,814 | B2 | 5/2013 | Cooper |
| 8,475,594 | B2 | 7/2013 | Bright et al. |
| 8,475,708 | B2 | 7/2013 | Cooper |
| 8,480,950 | B2 | 7/2013 | Jetten et al. |
| 8,501,084 | B2 | 8/2013 | Cooper |
| 8,524,146 | B2 | 9/2013 | Cooper |
| 8,529,828 | B2 | 9/2013 | Cooper |
| 8,535,603 | B2 | 9/2013 | Cooper |
| 8,580,218 | B2 | 11/2013 | Turenne et al. |
| 8,613,884 | B2 | 12/2013 | Cooper |
| 8,714,914 | B2 | 5/2014 | Cooper |
| 8,753,563 | B2 | 6/2014 | Cooper |
| 8,840,359 | B2 | 9/2014 | Vick et al. |
| 8,899,932 | B2 | 12/2014 | Tetkoskie et al. |
| 8,915,830 | B2 | 12/2014 | March et al. |
| 8,920,680 | B2 | 12/2014 | Mao |
| 9,011,761 | B2 | 4/2015 | Cooper |
| 9,017,597 | B2 | 4/2015 | Cooper |
| 9,034,244 | B2 | 5/2015 | Cooper |
| 9,057,376 | B2 | 6/2015 | Thut |
| 9,057,377 | B1 | 6/2015 | Thut |
| 9,074,601 | B1 | 7/2015 | Thut |
| 9,080,577 | B2 | 7/2015 | Cooper |
| 9,108,224 | B2 | 8/2015 | Schererz et al. |
| 9,108,244 | B2 | 8/2015 | Cooper |
| 9,156,087 | B2 | 10/2015 | Cooper |
| 9,193,532 | B2 | 11/2015 | March et al. |
| 9,205,490 | B2 | 12/2015 | Cooper |
| 9,234,520 | B2 | 1/2016 | Morando |
| 9,273,376 | B2 | 3/2016 | Lutes et al. |
| 9,328,615 | B2 | 5/2016 | Cooper |
| 9,377,028 | B2 | 6/2016 | Cooper |
| 9,382,599 | B2 | 7/2016 | Cooper |
| 9,383,140 | B2 | 7/2016 | Cooper |
| 9,388,925 | B2 | 7/2016 | Juarez |
| 9,409,232 | B2 | 8/2016 | Cooper |
| 9,410,744 | B2 | 8/2016 | Cooper |
| 9,422,942 | B2 | 8/2016 | Cooper |
| 9,435,343 | B2 | 9/2016 | Cooper |
| 9,464,636 | B2 | 10/2016 | Cooper |
| 9,470,239 | B2 | 10/2016 | Cooper |
| 9,476,644 | B2 | 10/2016 | Howitt et al. |
| 9,481,035 | B2 | 11/2016 | Cooper |
| 9,481,918 | B2 | 11/2016 | Vild et al. |
| 9,482,469 | B2 | 11/2016 | Cooper |
| 9,494,366 | B1 | 11/2016 | Thut |
| 9,506,129 | B2 | 11/2016 | Cooper |
| 9,506,346 | B2 | 11/2016 | Bright et al. |
| 9,532,670 | B2 | 1/2017 | Vaessen et al. |
| 9,566,645 | B2 | 2/2017 | Cooper |
| 9,581,388 | B2 | 2/2017 | Cooper |
| 9,587,883 | B2 | 3/2017 | Cooper |
| 9,632,670 | B2 | 4/2017 | Wu et al. |
| 9,643,247 | B2 | 5/2017 | Cooper |
| 9,657,578 | B2 | 5/2017 | Cooper |
| 9,855,600 | B2 | 1/2018 | Cooper |
| 9,862,026 | B2 | 1/2018 | Cooper |
| 9,903,383 | B2 | 2/2018 | Cooper |
| 9,909,808 | B2 | 3/2018 | Cooper |
| 9,920,767 | B2 | 3/2018 | Klain et al. |
| 9,925,587 | B2 | 3/2018 | Cooper |
| 9,951,777 | B2 | 4/2018 | Morando et al. |
| 9,970,442 | B2 | 5/2018 | Tipton |
| 9,982,945 | B2 | 5/2018 | Cooper |
| 10,052,688 | B2 | 8/2018 | Cooper |
| 10,072,897 | B2 | 9/2018 | Cooper |
| 10,126,058 | B2 | 11/2018 | Cooper |
| 10,126,059 | B2 | 11/2018 | Cooper |
| 10,138,892 | B2 | 11/2018 | Cooper |
| 10,195,664 | B2 | 2/2019 | Cooper et al. |
| 10,267,314 | B2 | 4/2019 | Cooper |
| 10,274,256 | B2 | 4/2019 | Cooper |
| 10,302,361 | B2 | 5/2019 | Cooper |
| 10,307,821 | B2 | 6/2019 | Cooper |
| 10,309,725 | B2 | 6/2019 | Cooper |
| 10,322,451 | B2 | 6/2019 | Cooper |
| 10,345,045 | B2 | 7/2019 | Cooper |
| 10,352,620 | B2 | 7/2019 | Cooper |
| 10,428,821 | B2 | 10/2019 | Cooper |
| 10,458,708 | B2 | 10/2019 | Cooper |
| 10,465,688 | B2 | 11/2019 | Cooper |
| 10,562,097 | B2 | 2/2020 | Cooper |
| 10,570,745 | B2 | 2/2020 | Cooper |
| 10,641,270 | B2 | 5/2020 | Cooper |
| 10,641,279 | B2 | 5/2020 | Cooper |
| 10,675,679 | B2 | 6/2020 | Cooper |
| 11,020,798 | B2 | 6/2021 | Cooper |
| 11,098,719 | B2 | 8/2021 | Cooper |
| 11,098,720 | B2 | 8/2021 | Cooper |
| 11,103,920 | B2 | 8/2021 | Cooper |
| 11,130,173 | B2 | 9/2021 | Cooper |
| 11,149,747 | B2 | 10/2021 | Cooper |
| 11,167,345 | B2 | 11/2021 | Cooper |
| 11,185,916 | B2 | 11/2021 | Cooper |
| 11,286,939 | B2 | 3/2022 | Cooper |
| 11,358,216 | B2 | 6/2022 | Cooper |
| 11,358,217 | B2 | 6/2022 | Cooper |
| 11,391,293 | B2 | 7/2022 | Cooper |
| 11,471,938 | B2 | 10/2022 | Fontana |
| 11,519,414 | B2 | 12/2022 | Cooper |
| 2001/0000465 | A1 | 4/2001 | Thut |
| 2002/0089099 | A1 | 7/2002 | Denning |

(56) References Cited

U.S. PATENT DOCUMENTS

| | | | | |
|---|---|---|---|---|
| 2002/0102159 | A1* | 8/2002 | Thut | F04D 29/043 416/241 B |
| 2002/0146313 | A1 | 10/2002 | Thut | |
| 2002/0185790 | A1 | 12/2002 | Kilgensmith | |
| 2002/0185794 | A1 | 12/2002 | Vincent | |
| 2003/0047850 | A1 | 3/2003 | Areaux | |
| 2003/0075844 | A1 | 4/2003 | Mordue et al. | |
| 2003/0082052 | A1 | 5/2003 | Gilbert et al. | |
| 2003/0151176 | A1 | 8/2003 | Ohno | |
| 2003/0201583 | A1 | 10/2003 | Klingensmith | |
| 2004/0050525 | A1 | 3/2004 | Kennedy et al. | |
| 2004/0076533 | A1 | 4/2004 | Cooper | |
| 2004/0096330 | A1 | 5/2004 | Gilbert et al. | |
| 2004/0115079 | A1* | 6/2004 | Cooper | F04D 7/065 417/424.1 |
| 2004/0245684 | A1 | 12/2004 | Kojo et al. | |
| 2004/0262825 | A1 | 12/2004 | Cooper | |
| 2005/0013713 | A1* | 1/2005 | Cooper | F04D 29/2227 417/423.1 |
| 2005/0013714 | A1 | 1/2005 | Cooper | |
| 2005/0013715 | A1 | 1/2005 | Cooper | |
| 2005/0053499 | A1 | 3/2005 | Cooper | |
| 2005/0077730 | A1 | 4/2005 | Thut | |
| 2005/0081607 | A1 | 4/2005 | Patel et al. | |
| 2005/0116398 | A1 | 6/2005 | Tremblay | |
| 2006/0180963 | A1 | 8/2006 | Thut | |
| 2006/0198725 | A1 | 9/2006 | Thut | |
| 2007/0253807 | A1 | 11/2007 | Cooper | |
| 2008/0163999 | A1 | 7/2008 | Hymas et al. | |
| 2008/0202644 | A1 | 8/2008 | Grassi | |
| 2008/0211147 | A1 | 9/2008 | Cooper | |
| 2008/0213111 | A1 | 9/2008 | Cooper | |
| 2008/0230966 | A1 | 9/2008 | Cooper | |
| 2008/0253905 | A1 | 10/2008 | Morando et al. | |
| 2008/0304970 | A1 | 12/2008 | Cooper | |
| 2008/0314548 | A1 | 12/2008 | Cooper | |
| 2009/0054167 | A1 | 2/2009 | Cooper | |
| 2009/0140013 | A1* | 6/2009 | Cooper | F04D 29/026 222/594 |
| 2009/0269191 | A1 | 10/2009 | Cooper | |
| 2010/0104415 | A1 | 4/2010 | Morando | |
| 2010/0200354 | A1 | 8/2010 | Yagi et al. | |
| 2011/0133374 | A1 | 6/2011 | Cooper | |
| 2011/0140318 | A1 | 6/2011 | Reeves et al. | |
| 2011/0140319 | A1 | 6/2011 | Cooper | |
| 2011/0140619 | A1 | 6/2011 | Lin et al. | |
| 2011/0142603 | A1 | 6/2011 | Cooper | |
| 2011/0142606 | A1 | 6/2011 | Cooper | |
| 2011/0148012 | A1 | 6/2011 | Cooper | |
| 2011/0163486 | A1 | 7/2011 | Cooper | |
| 2011/0210232 | A1 | 9/2011 | Cooper | |
| 2011/0220771 | A1 | 9/2011 | Cooper | |
| 2011/0227338 | A1 | 9/2011 | Pollack | |
| 2011/0303706 | A1 | 12/2011 | Cooper | |
| 2012/0003099 | A1* | 1/2012 | Tetkoskie | F04D 7/065 416/223 R |
| 2012/0163959 | A1 | 6/2012 | Morando | |
| 2013/0105102 | A1 | 5/2013 | Cooper | |
| 2013/0142625 | A1 | 6/2013 | Cooper | |
| 2013/0214014 | A1 | 8/2013 | Cooper | |
| 2013/0224038 | A1* | 8/2013 | Tetkoskie | F01D 5/147 416/241 R |
| 2013/0292426 | A1 | 11/2013 | Cooper | |
| 2013/0292427 | A1 | 11/2013 | Cooper | |
| 2013/0299524 | A1 | 11/2013 | Cooper | |
| 2013/0299525 | A1 | 11/2013 | Cooper | |
| 2013/0306687 | A1 | 11/2013 | Cooper | |
| 2013/0334744 | A1 | 12/2013 | Tremblay et al. | |
| 2013/0343904 | A1 | 12/2013 | Cooper | |
| 2014/0008849 | A1 | 1/2014 | Cooper | |
| 2014/0041252 | A1 | 2/2014 | Vild et al. | |
| 2014/0044520 | A1 | 2/2014 | Tipton | |
| 2014/0083253 | A1 | 3/2014 | Lutes et al. | |
| 2014/0210144 | A1 | 7/2014 | Torres et al. | |
| 2014/0232048 | A1 | 8/2014 | Howitt et al. | |
| 2014/0252697 | A1 | 9/2014 | Rauch | |
| 2014/0252701 | A1 | 9/2014 | Cooper | |
| 2014/0261800 | A1 | 9/2014 | Cooper | |
| 2014/0263482 | A1 | 9/2014 | Cooper | |
| 2014/0265068 | A1 | 9/2014 | Cooper | |
| 2014/0271219 | A1 | 9/2014 | Cooper | |
| 2014/0363309 | A1 | 12/2014 | Henderson et al. | |
| 2015/0069679 | A1 | 3/2015 | Henderson et al. | |
| 2015/0184311 | A1 | 7/2015 | Turenne | |
| 2015/0192364 | A1 | 7/2015 | Cooper | |
| 2015/0217369 | A1 | 8/2015 | Cooper | |
| 2015/0219111 | A1 | 8/2015 | Cooper | |
| 2015/0219112 | A1 | 8/2015 | Cooper | |
| 2015/0219113 | A1 | 8/2015 | Cooper | |
| 2015/0219114 | A1 | 8/2015 | Cooper | |
| 2015/0224574 | A1 | 8/2015 | Cooper | |
| 2015/0252807 | A1 | 9/2015 | Cooper | |
| 2015/0285557 | A1 | 10/2015 | Cooper | |
| 2015/0285558 | A1 | 10/2015 | Cooper | |
| 2015/0323256 | A1 | 11/2015 | Cooper | |
| 2015/0328682 | A1 | 11/2015 | Cooper | |
| 2015/0328683 | A1 | 11/2015 | Cooper | |
| 2016/0031007 | A1 | 2/2016 | Cooper | |
| 2016/0040265 | A1 | 2/2016 | Cooper | |
| 2016/0047602 | A1 | 2/2016 | Cooper | |
| 2016/0053762 | A1 | 2/2016 | Cooper | |
| 2016/0053814 | A1 | 2/2016 | Cooper | |
| 2016/0082507 | A1 | 3/2016 | Cooper | |
| 2016/0089718 | A1 | 3/2016 | Cooper | |
| 2016/0091251 | A1 | 3/2016 | Cooper | |
| 2016/0116216 | A1 | 4/2016 | Schlicht et al. | |
| 2016/0221855 | A1 | 8/2016 | Retorick et al. | |
| 2016/0250686 | A1 | 9/2016 | Cooper | |
| 2016/0265535 | A1* | 9/2016 | Cooper | F04D 7/065 |
| 2016/0305711 | A1 | 10/2016 | Cooper | |
| 2016/0320129 | A1 | 11/2016 | Cooper | |
| 2016/0320130 | A1 | 11/2016 | Cooper | |
| 2016/0320131 | A1 | 11/2016 | Cooper | |
| 2016/0346836 | A1 | 12/2016 | Henderson et al. | |
| 2016/0348973 | A1 | 12/2016 | Cooper | |
| 2016/0348974 | A1 | 12/2016 | Cooper | |
| 2016/0348975 | A1 | 12/2016 | Cooper | |
| 2017/0037852 | A1 | 2/2017 | Bright et al. | |
| 2017/0038146 | A1 | 2/2017 | Cooper | |
| 2017/0045298 | A1 | 2/2017 | Cooper | |
| 2017/0056973 | A1 | 3/2017 | Tremblay et al. | |
| 2017/0082368 | A1 | 3/2017 | Cooper | |
| 2017/0106435 | A1 | 4/2017 | Vincent | |
| 2017/0106441 | A1 | 4/2017 | Vincent | |
| 2017/0130298 | A1 | 5/2017 | Teranishi et al. | |
| 2017/0167793 | A1 | 6/2017 | Cooper et al. | |
| 2017/0198721 | A1 | 7/2017 | Cooper | |
| 2017/0219289 | A1 | 8/2017 | Williams et al. | |
| 2017/0241713 | A1 | 8/2017 | Henderson et al. | |
| 2017/0246681 | A1 | 8/2017 | Tipton et al. | |
| 2017/0276430 | A1 | 9/2017 | Cooper | |
| 2018/0058465 | A1* | 3/2018 | Cooper | F04D 29/026 |
| 2018/0111189 | A1 | 4/2018 | Cooper | |
| 2018/0178281 | A1 | 6/2018 | Cooper | |
| 2018/0195513 | A1 | 7/2018 | Cooper | |
| 2018/0311726 | A1 | 11/2018 | Cooper | |
| 2019/0032675 | A1 | 1/2019 | Cooper | |
| 2019/0270134 | A1 | 9/2019 | Cooper | |
| 2019/0293089 | A1 | 9/2019 | Cooper | |
| 2019/0351481 | A1 | 11/2019 | Tetkoskie | |
| 2019/0360491 | A1 | 11/2019 | Cooper | |
| 2019/0360492 | A1 | 11/2019 | Cooper | |
| 2019/0368494 | A1 | 12/2019 | Cooper | |
| 2020/0130050 | A1 | 4/2020 | Cooper | |
| 2020/0130051 | A1 | 4/2020 | Cooper | |
| 2020/0130052 | A1 | 4/2020 | Cooper | |
| 2020/0130053 | A1 | 4/2020 | Cooper | |
| 2020/0130054 | A1 | 4/2020 | Cooper | |
| 2020/0182247 | A1 | 6/2020 | Cooper | |
| 2020/0182248 | A1 | 6/2020 | Cooper | |
| 2020/0256350 | A1 | 8/2020 | Cooper | |
| 2020/0360987 | A1 | 11/2020 | Cooper | |
| 2020/0360988 | A1 | 11/2020 | Fontana | |

(56) References Cited

U.S. PATENT DOCUMENTS

| | | | |
|---|---|---|---|
| 2020/0360989 | A1 | 11/2020 | Cooper |
| 2020/0360990 | A1 | 11/2020 | Cooper |
| 2020/0362865 | A1 | 11/2020 | Cooper |
| 2021/0199115 | A1 | 7/2021 | Cooper |
| 2021/0254622 | A1 | 8/2021 | Cooper |
| 2022/0025905 | A1 | 1/2022 | Cooper |
| 2022/0080498 | A1 | 3/2022 | Cooper |
| 2022/0193764 | A1 | 6/2022 | Cooper |
| 2022/0213895 | A1 | 7/2022 | Cooper |
| 2022/0234099 | A1 | 7/2022 | Cooper |
| 2022/0381246 | A1 | 12/2022 | Cooper |
| 2023/0001474 | A1 | 1/2023 | Cooper |
| 2023/0219132 | A1 | 7/2023 | Cooper |

FOREIGN PATENT DOCUMENTS

| | | | | |
|---|---|---|---|---|
| CA | 2244251 | | | 6/1998 |
| CA | 2305865 | | | 2/2000 |
| CA | 2176475 | | | 7/2005 |
| CA | 2924572 | | | 4/2015 |
| CH | 392268 | | | 9/1965 |
| CN | 102943761 | | | 2/2013 |
| CN | 103511331 | A | * | 1/2014 |
| DE | 1800446 | | | 12/1969 |
| DE | 19541093 | | | 5/1997 |
| DE | 19614350 | | | 10/1997 |
| DE | 102006051814 | | | 7/2008 |
| EP | 168250 | | | 1/1986 |
| EP | 665378 | | | 8/1995 |
| EP | 1019635 | | | 6/2006 |
| GB | 543607 | | | 3/1942 |
| GB | 942648 | | | 11/1963 |
| GB | 1185314 | | | 3/1970 |
| GB | 1565911 | A | | 4/1980 |
| GB | 1575991 | | | 10/1980 |
| GB | 212260 | | | 1/1984 |
| GB | 2193257 | | | 2/1988 |
| GB | 2217784 | | | 3/1989 |
| GB | 2289919 | | | 12/1995 |
| JP | 58048796 | | | 3/1983 |
| JP | 63104773 | | | 5/1988 |
| JP | 11-270799 | | | 10/1999 |
| JP | 5112837 | | | 1/2013 |
| MX | 227385 | | | 4/2005 |
| NO | 90756 | | | 1/1959 |
| SU | 416401 | | | 2/1974 |
| SU | 773312 | | | 10/1980 |
| WO | 199808990 | | | 3/1998 |
| WO | 199825031 | | | 6/1998 |
| WO | 200009889 | A1 | | 2/2000 |
| WO | 200091159 | | | 2/2000 |
| WO | 2002012147 | | | 2/2002 |
| WO | 2004029307 | | | 4/2004 |
| WO | 2010147932 | | | 12/2010 |
| WO | 2014031484 | | | 2/2014 |
| WO | 2014055082 | | | 4/2014 |
| WO | 2014150503 | | | 9/2014 |
| WO | 2014185971 | | | 11/2014 |

OTHER PUBLICATIONS

Document No. 504217: Excerpts from “Pyrotek Inc.’s Motion for Summary Judgment of Invalidity and Unenforceability of U.S. Pat. No. 7,402,276,” Oct. 2, 2009.

Document No. 505026: Excerpts from “MMEI’s Response to Pyrotek’s Motion for Summary Judgment of Invalidity or Enforceability of U.S. Pat. No. 7,402,276,” Oct. 9, 2009.

Document No. 507689: Excerpts from “MMEI’s Pre-Hearing Brief and Supplemental Motion for Summary Judgment of Infringement of Claims 3, 4, 15, 17-20, 26, 28 and 29 of the ’074 Patent and Motion for Reconsideration of the Validity of Claims 7-9 of the ’276 Patent,” Nov. 4, 2009.

Document No. 517158: Excerpts from “Reasoned Award,” Feb. 19, 2010.

Document No. 525055: Excerpts from “Molten Metal Equipment Innovations, Inc.’s Reply Brief in Support of Application to Confirm Arbitration Award and Opposition to Motion to Vacate,” May 12, 2010.

USPTO; Notice of Reissue Examination Certificate dated Aug. 27, 2001 in U.S. Appl. No. 90/005,910.

* cited by examiner

MOLTEN METAL ROTOR WITH HARDENED BLADE TIPS

CROSS REFERENCE TO RELATED APPLICATION

This application is a continuation of, and claims priority to U.S. patent application Ser. No. 15/013,879, filed on Feb. 2, 2016, by Paul V. Cooper which claims priority to U.S. Provisional Application Ser. No. 62/110,899 entitled "Molten Metal Rotor with Hardened Blade Tips," filed on Feb. 2, 2015. Each of the foregoing applications are incorporated herein in their entirety for all purposes.

FIELD OF THE INVENTION

The present invention relates to a rotor (also called an impeller) for pumping molten metal, the rotor having hardened blade tips. The purpose of the hardened blade tips is to decrease wear, and help prevent breakage, on portions of the rotor that are struck by dross or other hard objects found in molten metal.

BACKGROUND OF THE INVENTION

As used herein, the term "molten metal" means any metal or combination of metals in liquid form, such as aluminum, copper, iron, zinc and alloys thereof, in which devices according to the invention can function. The term "gas" means any gas or combination of gases, including argon, nitrogen, chlorine, fluorine, freon, and helium, that are released into molten metal.

Known molten-metal pumps include a pump base (also called a housing or casing), one or more inlets (an inlet being an opening in the housing to allow molten metal to enter a pump chamber), a pump chamber, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive system is typically an impeller shaft connected to one end of a drive shaft, the other end of the drive shaft being connected to a motor. Often, the impeller shaft is comprised of graphite, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber.

A number of submersible pumps used to pump molten metal (referred to herein as molten metal pumps) are known in the art. For example, U.S. Pat. No. 2,948,524 to Sweeney et al., U.S. Pat. No. 4,169,584 to Mangalick, U.S. Pat. No. 5,203,681 to Cooper, U.S. Pat. No. 6,093,000 to Cooper and U.S. Pat. No. 6,123,523 to Cooper, and U.S. Pat. No. 6,303,074 to Cooper, all disclose molten metal pumps. The disclosures of the patents to Cooper noted above are incorporated herein by reference, as are U.S. Pat. Nos. 7,402,276 and 7,507,367. The term submersible means that when the pump is in use, its base and rotor are at least partially submerged in a bath of molten metal, and preferably fully submerged.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Circulation pumps may be used in a reverberatory furnace having an external well, or in any other suitable vessel that retains molten metal. The well is usually an extension of the charging well where scrap metal is charged (i.e., added).

Transfer pumps are generally used to transfer molten metal from the external well of a reverberatory furnace to a different location such as a ladle or another furnace.

Gas-release pumps, such as gas-injection pumps, circulate molten metal while releasing a gas into the molten metal. In the purification of molten metals, particularly aluminum, it is frequently desired to remove dissolved gases such as hydrogen, or dissolved metals, such as magnesium, from the molten metal. As is known by those skilled in the art, the removing of dissolved gas is known as "degassing" while the removal of magnesium is known as "demagging." Gas-release pumps may be used for either of these purposes or for any other application for which it is desirable to introduce gas into molten metal. Gas-release pumps generally include a gas-transfer conduit having a first end that is connected to a gas source and a second submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where it enters the pump chamber. A system for releasing gas into a pump chamber is disclosed in U.S. Pat. No. 6,123,523 to Cooper. Furthermore, gas may be released into a stream of molten metal passing through a discharge or metal-transfer conduit wherein the position of a gas-release opening in the metal-transfer conduit enables pressure from the molten metal stream to assist in drawing gas into the molten metal stream. Such a structure and method is disclosed in a copending application entitled "System for Releasing Gas Into Molten Metal," invented by Paul V. Cooper, and filed on Feb. 4, 2004, the disclosure of which is incorporated herein by reference.

There are also pumping systems that include a rotor inside of an essentially vertical conduit to drive molten metal upward into the conduit and out of an outlet in communication with the conduit. No pump base is used with such a system.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. A ceramic is harder and more durable to impact with a hard substance than graphite. "Graphite" means any type of graphite, whether or not chemically treated. Graphite is particularly suitable for being formed into pump components because it is (a) soft and relatively easy to machine, and (b) less expensive than ceramics.

When a molten metal pump, or pumping system, is operated, the rotor rotates, and the molten metal in which the rotor operates includes solid particles, such as dross and brick. As the rotor rotates the solid particles strike the moving rotor, potentially jamming or damaging the rotor and one or more of the other pump components, such as the rotor shaft.

Many attempts have been made to solve this problem, including the use of filters or disks to prevent solid particles from entering the inlet and the use of a non-volute pump chamber to increase the space between the inlet and rotor to allow solid pieces to pass into the pump chamber without jamming, where they can be pushed through the discharge by the action of the rotor.

SUMMARY OF THE INVENTION

The present invention relates to rotors used for pumping molten metal wherein the rotors have blades with hardened tips to alleviate damage to the rotor caused by dross or other hard particles striking the rotor as molten metal is pumped. The tips are at least twice as hard as the body portion of the rotor.

In one embodiment, the hardened tips are comprised of silicon carbide and the body portion is comprised of graphite. Aspects of the invention can be utilized on any molten metal rotor, whether used in a molten metal pump, a molten metal pumping system, a scrap melter, a degasser, or other device.

DETAILED DESCRIPTION OF PREFERRED EMBODIMENTS

Figure 1:
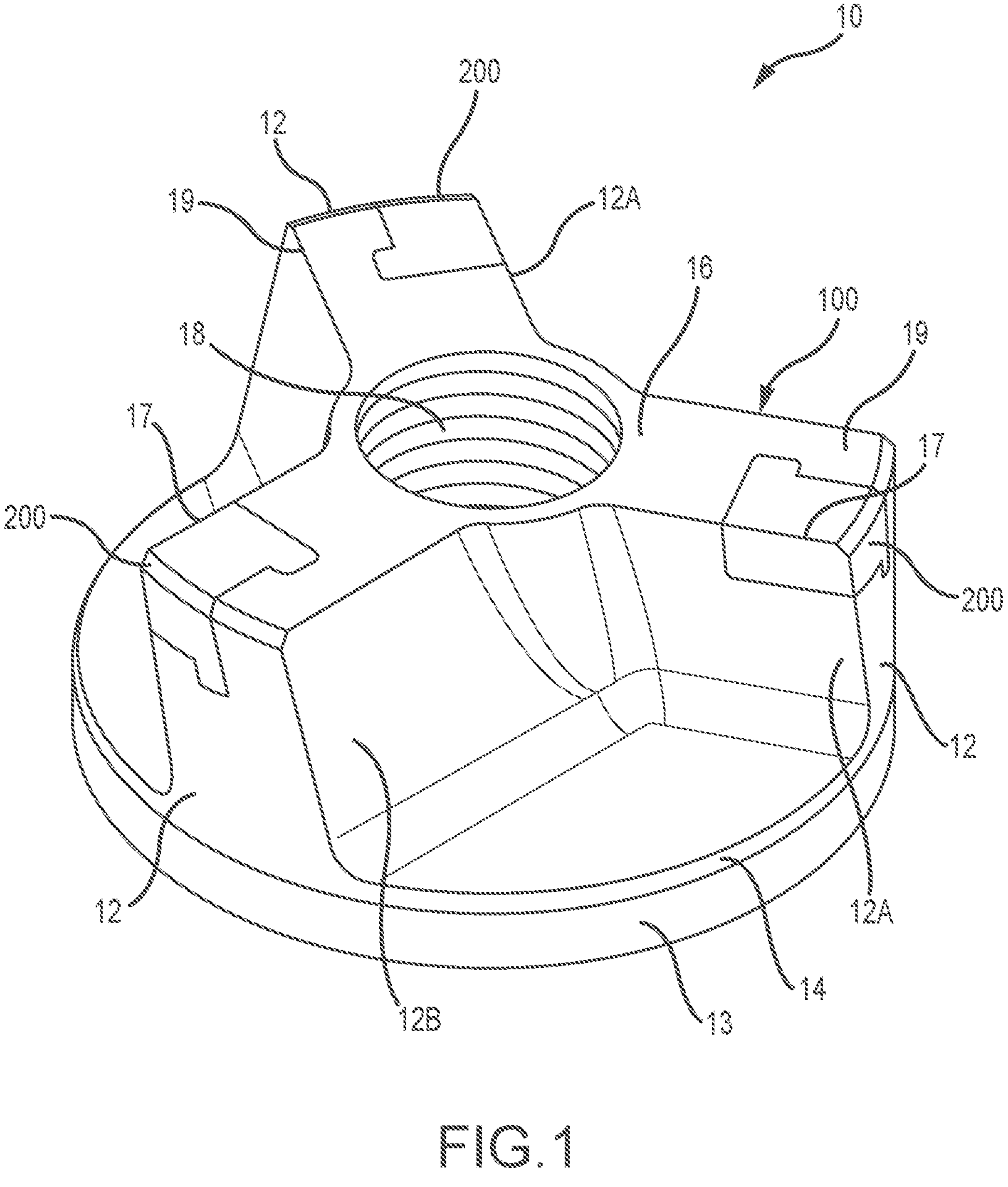
FIG. 1 shows a front, perspective view of a rotor according to the invention.
Figure 2:
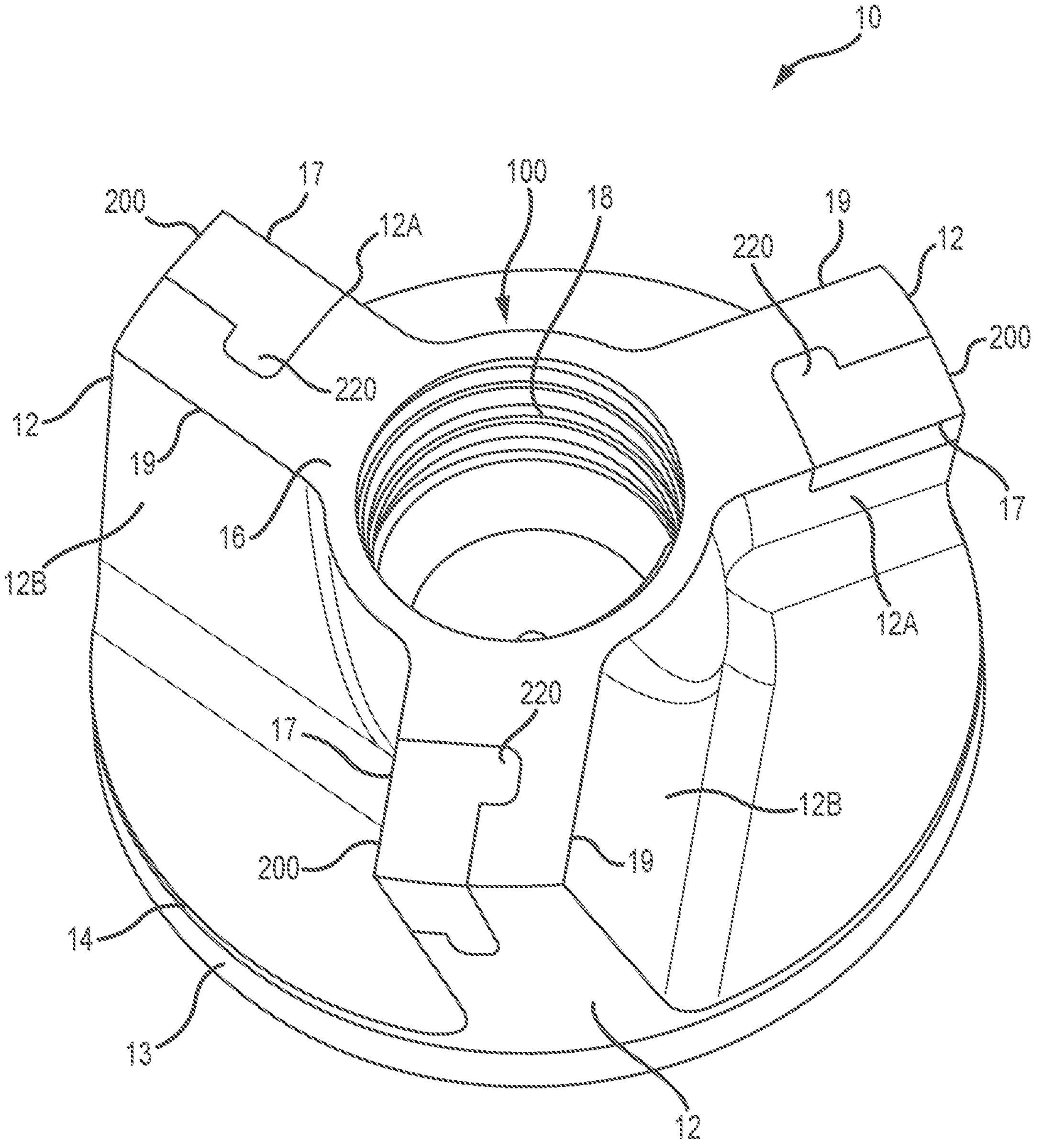
FIG. 2 shows a top, perspective view of the rotor of FIG. 1.
Figure 3:
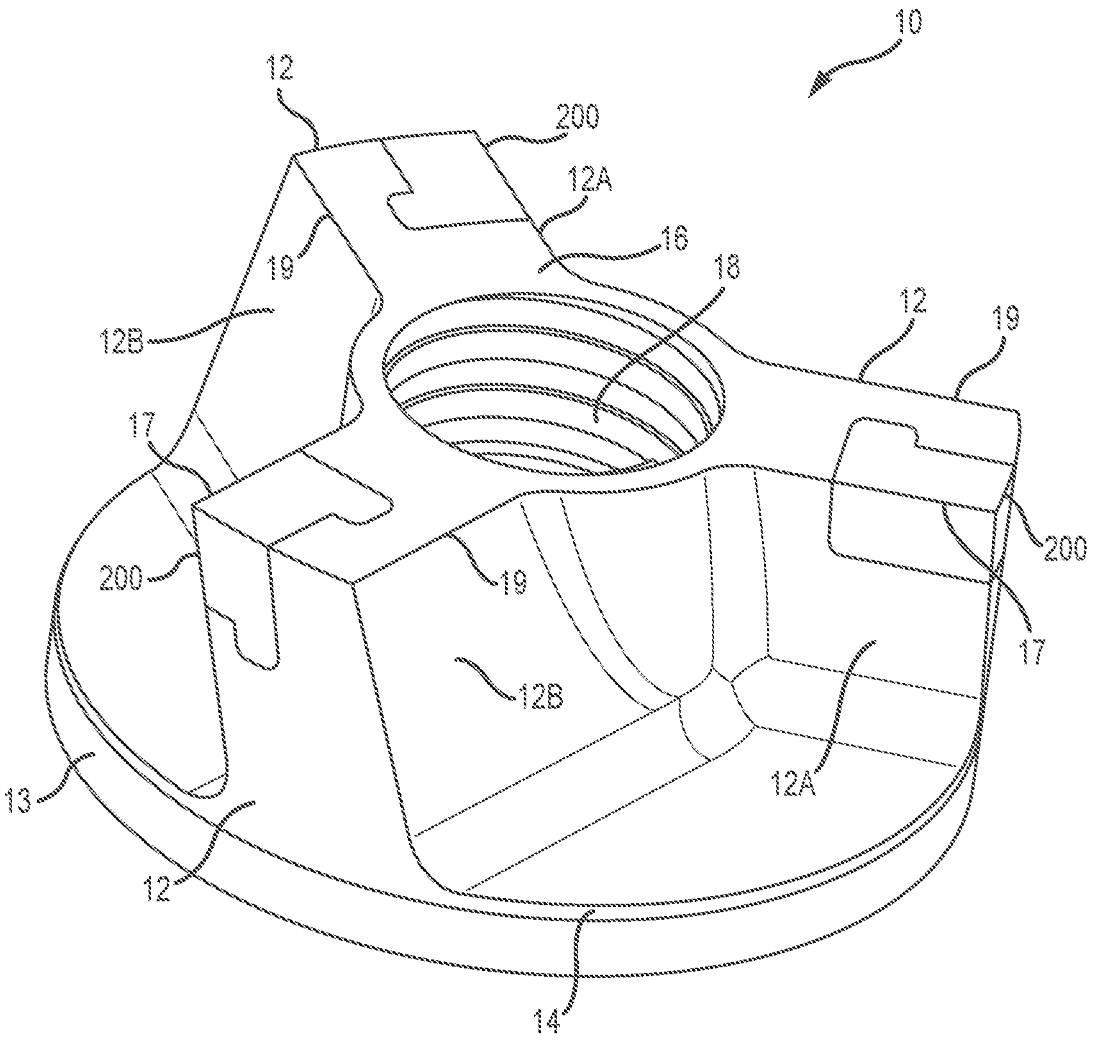
FIG. 3 shows a side, perspective view of the rotor of FIG. 1.

As used herein the relative hardness of materials is determined by the MOHS hardness scale. On the MOHS hardness scale, treated graphite (also referred to herein simply as graphite) is preferably used to form a rotor body according to the invention) generally has a hardness between 1.5 and 2.5 on the MOHS scale, whereas silicon carbide (preferably used to form a hardened tip according to the invention) generally has a hardness of 9-10 on the MOHS scale. By way of example, if a first material has a MOHS scale hardness of 1.0 and a second material has a MOHS scale hardness of 2.0, the second material is considered to be twice as hard as the first material for the purpose of this disclosure. Similarly, as an example, a third material with a MOHS scale hardness of 3.0 would be three times as hard as the first material and 50% harder than the second material for the purpose of this disclosure.

Turning now to the drawings, where the purpose is to describe preferred embodiments of the invention and not to limit same, systems and devices according to the invention will be described.

FIGS. 1-4B show one preferred rotor, and components thereof, according to aspects of the invention. Rotor 10 as shown preferably has a rotor body 100, three identical rotor blades (also called "vanes") 12, and hardened tips 200 on each blade. As used herein, a rotor blade (or "vane") is a structure separate from and spaced from other rotor blades, although a separate structure such as an outer ring may connect one or more blades. In rotor 10 each blade 12 as shown is curved inward on its leading surface 12A, meaning that it directs molten metal downward and outward (if the rotor is used on a top feed pump), or directs molten metal upward and outward if the rotor is used on a bottom feed pump, or in a system for pumping molten metal that directs the molten metal upward into a conduit. But, blades according to the invention may be of any suitable shape and size for the purpose for which they are used. A recess or trailing surface 12B as shown preferably extends from top surface 16 to bottom 14. The purpose of the angle or curve of trailing surface 12B is to reduce the area of top surface 16, thereby creating a larger opening for more molten metal to enter into the rotor 10 thus enabling rotor 10 to move more molten metal per rotor revolution and any suitable shape may be used for this purpose.

Rotor 10 may have a flow blocking and bearing plate 13. As shown, flow blocking and bearing plate 13 is cemented or otherwise attached to the bottom 14 of rotor 10. If rotor 10 is used on a bottom feed pump, the flow blocking and bearing plate 13 may be at the top of the rotor (in essence, the rotor would be turned upside down, with the blades 12 at the bottom, but the rotor shaft connective portion 18 would still be at the top of the rotor and formed through the flow blocking and bearing plate). The flow blocking and bearing plate 13 is preferably comprised of a hard, wear-resistant material, such as silicon carbide. Alternatively, a rotor according to the invention may not be attached to a flow blocking and bearing plate and any not have a bottom 14. For example, the rotor may be used in a system for moving molten metal upward into a conduit, or with scarp melter, or with a rotory degasser.

Rotor 10 further includes a connective portion 18, which is preferably a threaded bore, but can be any structure capable of drivingly engaging a rotor shaft (not shown) in order to rotate the rotor. It is most preferred that the outer surface of the end of a rotor shaft that is received in connective portion 18 has tapered threads and connective portion 18 be threaded to receive the tapered threads.

The preferred dimensions of rotor 10 will depend upon the size of the pump chamber or other structure in which the rotor is received and/or used. If rotor 10 is positioned in a pump chamber, top surface 16 is preferably flush with the pump chamber inlet.

Hardened tips 200 are preferably at least: twice as hard as the body portion 100, or 2-3 times harder than the body portion 100, or 2-4 times harder than the body portion 100, or 2-5 times harder than the body portion 100, or 2-6 times harder, 2-7 times harder, 2-8 times harder, 2-9 times harder, 2-10 times harder than the body portion 100. In one preferred embodiment, the body portion 100 is graphite and the tips 200 are silicon carbide.

Each hardened tip 200 preferably extends along at least part of top surface 16, and as shown each hardened tip extends along part of the leading surface 12A of each rotor blade 12. Preferably, each hardened tip 200 forms at least: 15%, or at least 20%, or at least 25%, or at least 30%, or at least 35%, or at least 40%, or at least 50%, or at least 75%, or at least 90%, or 100%, or 30%-100%, of the leading edge 17 of rotor 10.

The height of surface 12A is measured from edge 17 to the upper surface of bottom 14. Each hardened tip 200 also preferably extends downward along leading surface 12A by at least: 10% of the height of surface 12A, or at least 15% of the height of surface 12A, or at least 20% of the height of surface 12A, or at least 25% of the height of surface 12A, or at least 30% of the height of surface 12A, or at least 40% of the height of surface 12A, or at least 50% of the height of surface 12A, or at least 75% of the height of surface 12A, or 30%-100% of the height of surface 12A.

Each hardened tip 200 also preferably extends downward along the outermost edge of each vane 12 by at least: 15% of the height of surface 12A, at least 20% of the height of surface 12A, at least 25% of the height of surface 12A, at least 30% of the height of surface 12A. Each tip 200 also preferably extends along top surface 16 between leading edge 17 and trailing edge 19, by at least: 10%, at least 20%, at least 30%, at least 40%, or at least 50%, or 30%-100% of the distance between leading edge 17 and trailing edge 19.

Figure 4:
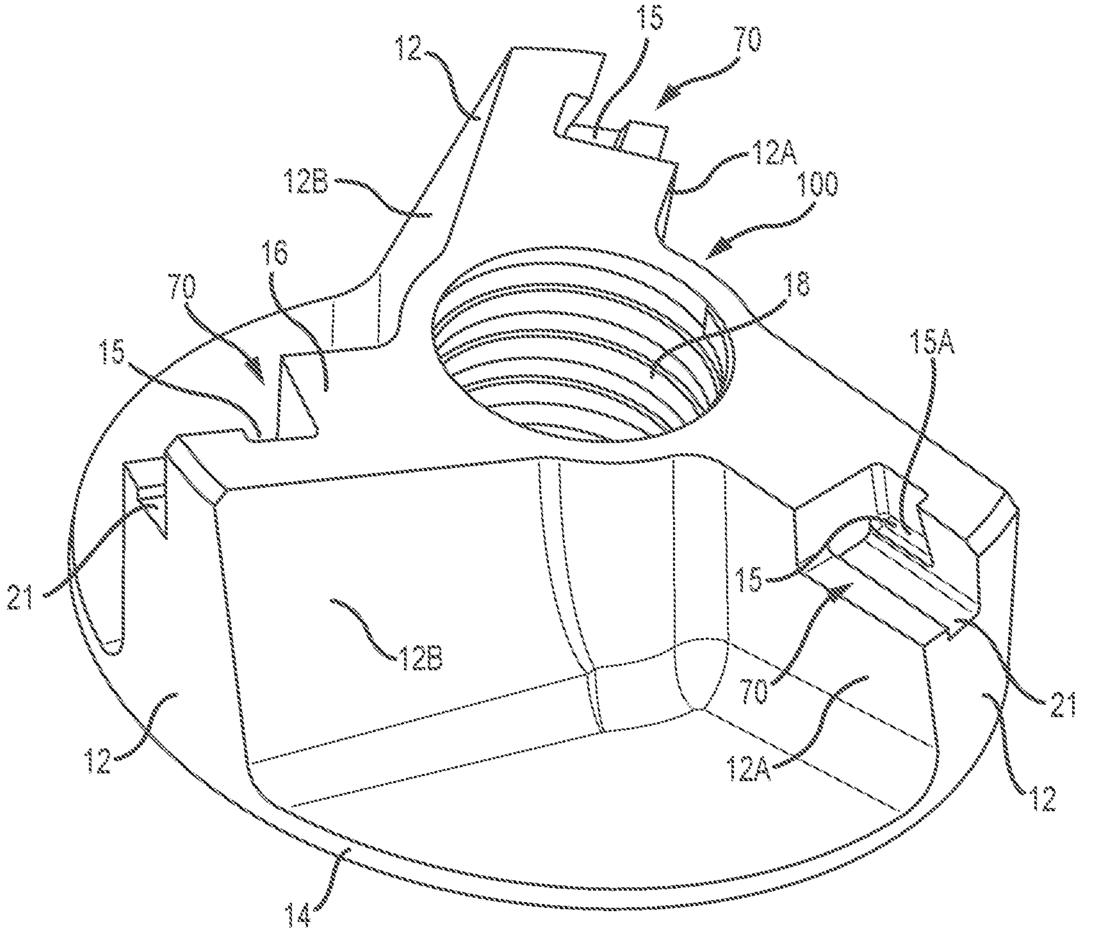
FIG. 4 shows a side, perspective view of the rotor of FIG. 1 without the hardened tips.
Figure 4A:
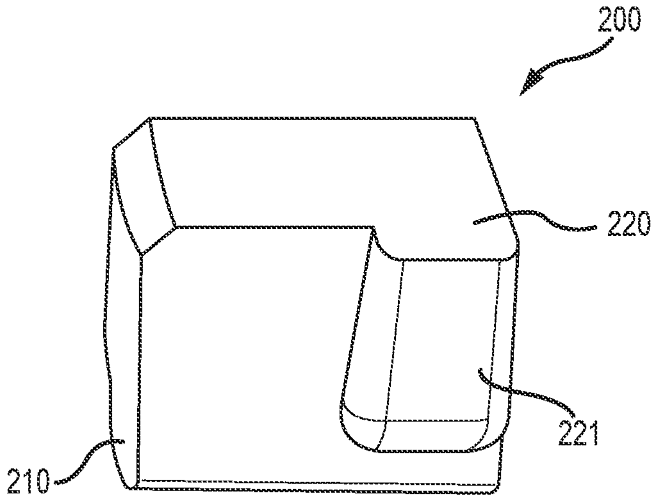
FIG. 4A shows a rear view of a hardened tip used in the rotor of FIG. 1.
Figure 4B:
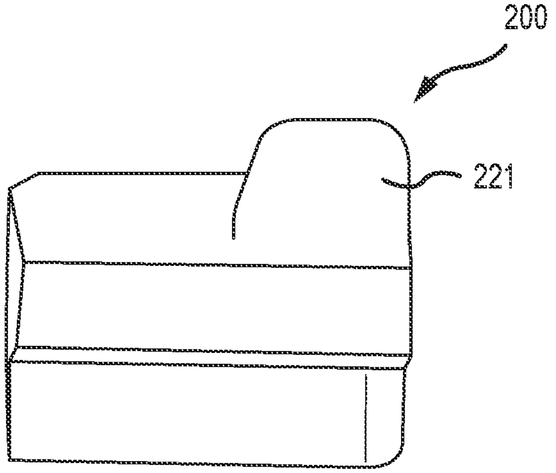
FIG. 4B shows a front view of a hardened tip used in the rotor of FIG. 1.
Figure 5:
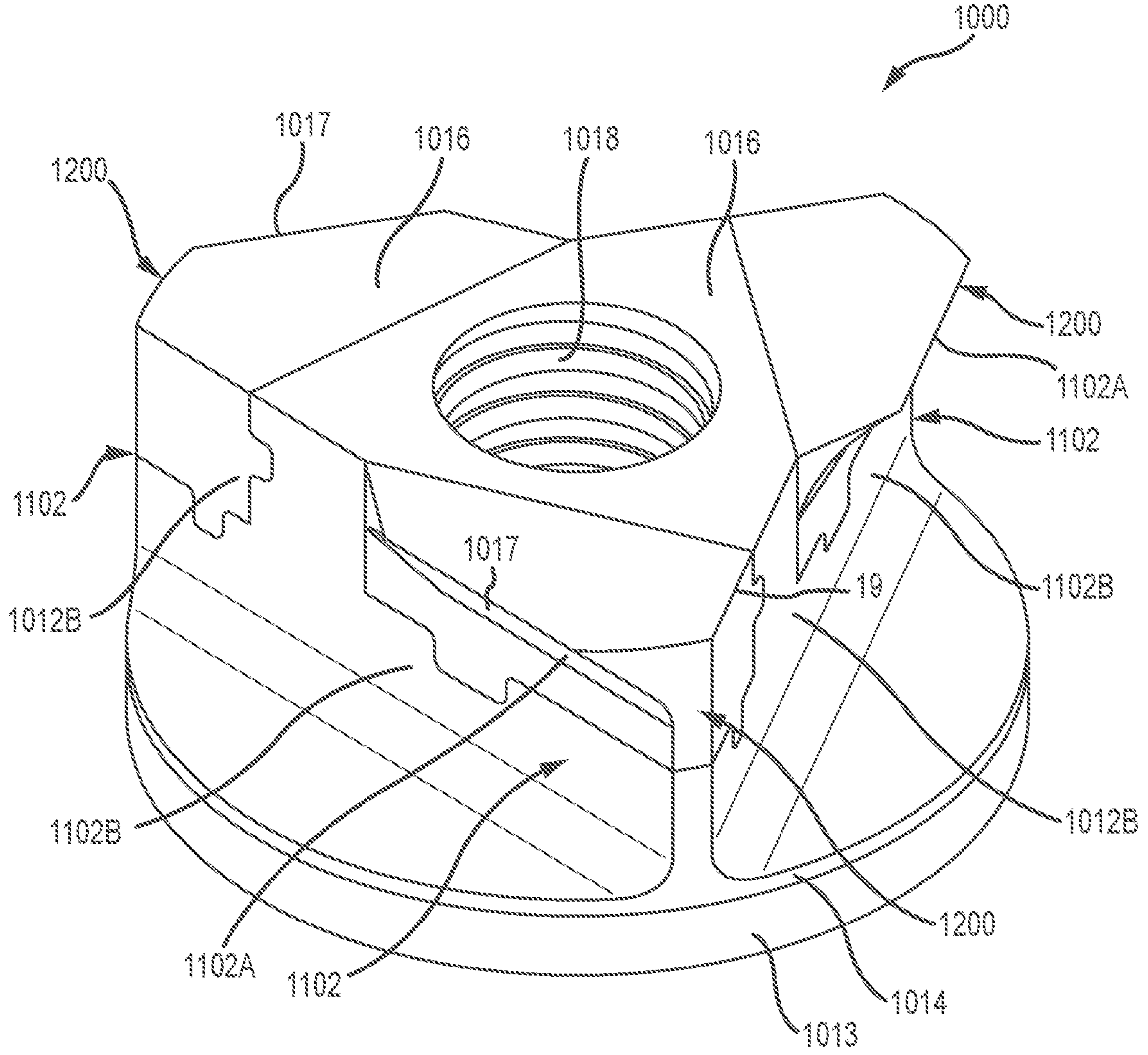
FIG. 5 shows a front perspective view of alternate version of a rotor in accordance with the invention.

FIGS. 4-4B shows body portion 100 and hardened tips 200 prior to being assembled. In order to secure the tips 200 to the body portion 100, it is preferred that portions of the corners of each blade 12 on body 100 have cut-outs 70 to create channels 15, and projections 210 on tips 200 are designed to snuggly fit into channels 15 when cemented in place. The mating of tips 200 to channels 15 helps secure tips 200 to body portion 100 and alleviate the possibility that they will come apart during use. Any suitable method, however, to connect tips 200 to body portion 100 may be used.

Additionally, as shown each cut-out 70 has a back channel 21 that mates with a corresponding extension section 221 on each tip 200 (which each has a top surface 220) to help secure tips 200 to rotor body 100. The tips 200 are preferably cemented in place in cut-outs 70.

FIGS. 5-8 show an alternate preferred rotor according to aspects of the invention. Rotor 1000 as shown is in many respects the same as rotor 10 except for the shape of the rotor 1000 and the shape of the hardened tips 1200. Rotor 1000 as shown preferably has a rotor body 1001, three identical rotor blades (also called "vanes") 1012, and hardened tips 1200 on each blade 1012. In rotor 1000 each blade 1102 is dual flow, meaning that it has a first portion 1102A, which as shown is entirely formed as part of tip 1200 although it need not be, that directs molten metal either downward or upward (downward if the rotor is used on a top-feed pump and upward if the rotor is used on a bottom-feed pump) towards a second portion 1102B that directs molten metal outward. However, blades according to the invention need not be dual flow.

Surface 1012A is angled (as used herein the term angled refers to both a substantially planar surface, or a curved surface, or a multifaceted surface) such that, as rotor 1000 turns (as shown it turns in a clockwise direction) surface 1012A directs molten metal towards second portion 1012B. Any surface that functions to direct molten metal towards second portion 1012B can be used, but it is preferred that surface 1012A is substantially planar and formed at a 30°-60°, and most preferably, a 45° angle.

A recess or trailing surface 1012B as shown preferably extends from top surface 1016 to bottom 1014. Trailing surface 1012B is flat and preferably dimensioned relative the size of rotor blade 1012 to help reduce the area of top surface 1016 on the blade, thereby creating a larger opening for more molten metal to enter into the rotor 1000 thus enabling rotor 1000 to move more molten metal per rotor revolution.

Rotor 1000 may have a flow blocking and bearing plate 1013. As shown, flow blocking and bearing plate 1013 is cemented or otherwise attached to the bottom 1014 of rotor 1000. If rotor 1000 is used on a bottom feed pump, the flow blocking and bearing plate 1013 may be at the top of the rotor (in essence, the rotor would be turned upside down, with the blades 1012 at the bottom, but the rotor shaft connective portion 1018 would still be at the top of the rotor and be formed through the flow blocking and hearing plate). The flow blocking and bearing plate 1013 is preferably comprised of a hard, wear-resistant material, such as silicon carbide. Alternatively, a rotor according to the invention may not be attached to a flow blocking and bearing plate and may not have a bottom 1014. For example, the rotor may be used in a system for moving molten metal upward into a conduit, or with scarp melter, or with a rotory degasser.

Hardened tips 1200 are preferably at least: twice as hard as the body portion 1001, or 2-3 times harder than the body portion 1001, or 2-4 times harder than the body portion 1001, or 2-5 times harder, or 2-6 times harder, or 2-7 times harder, or 2-8 times harder, or 2-9 times harder, or 2-10 times harder, than the body portion 1001. In one preferred embodiment, the body portion 1001 is graphite and the tips 1200 are silicon carbide. As shown, each hardened tip 1200 extends along at least part of top surface 1016, along part of the leading surface 1012A of each rotor blade 1012, and along part of the trailing surface 1012B of each rotor blade 1012.

Each hardened tip 1200 extends along at least part of top surface 1016, and as shown each hardened tip extends along part of the leading surface 1012A of each rotor blade 1012. Preferably, each hardened tip 1200 forms at least: 15%, or at least 20%, or at least 25%, or at least 30%, or at least 35%, or at least 40%, or at least 50%, or at least 75%, or at least 90%, or 100%, or 30%-100%, of the leading edge 1017. Each hardened tip 1200 also preferably extends downward along leading surface 1012A by at least: 10% of the height of surface 1012A, at least 15% of the height of surface 1012A, at least 20% of the height of surface 12A, at least 25% of the height of surface 1012A, at least 30%, or at least 40% of the height of surface 1012A, or at least 50% of the height of surface 1012A, or at least 75% of the height of surface 1012A, or 30%-100% of the height of surface 1012A, or at least the entire height of surface 1012A. The height of surface 1012A is measured from surface 1016 on edge 1017 to the upper surface of bottom 1014.

Each hardened tip 1200 also extends downward along the outermost edge of each vane 1012 by at least: 15% of the height of surface 1012A, at least 20% of the height of surface 1012A, at least 25% of the height of surface 1012A, at least 30% of the height of surface 1012A, at least 40% of the height of surface 1012A, at least 50% of the height of surface, at least 75% of the height of surface 1012A, or 30%-100% of the height of surface 1012A. Each tip 1200 also preferably extends along top surface 1016 between leading edge 1017 and trailing edge 1019, by at least 10%, at least 20%, at least 30%, at least 40%, at least 50%, at least 75%, or 30%-100%, of the distance between leading edge 1017 and trailing edge 19.

Each hardened tip also preferably forms part of and extends along at least 10% of the height of back surface 1012B (as measured from top surface 1016 to the top of bottom 1014), at least 20% of the height of back surface 1012B, at least 30% of the height of back surface 1012B, at least 40% of the height of back surface 1012B, or at least 50% of the height of back surface 1012B, at least 75% of the height of surface 1012B, or 30%-100% of the height of back surface 1012B.

Rotor 1000 further includes a connective portion 1018, which is preferably a threaded bore, but can be any structure capable of drivingly engaging a rotor shaft (not shown). It is most preferred that the outer surface of the end of a rotor shaft that is received in connective portion 1018 has tapered threads and connective portion 1018 be threaded to receive the tapered threads.

The preferred dimensions of rotor 1000 will depend upon the size of the pump chamber or other structure in which it is received and/or used. If rotor 1000 is positioned in a pump chamber, top surface 1016 is preferably flush with the pump chamber inlet.

Figure 6:
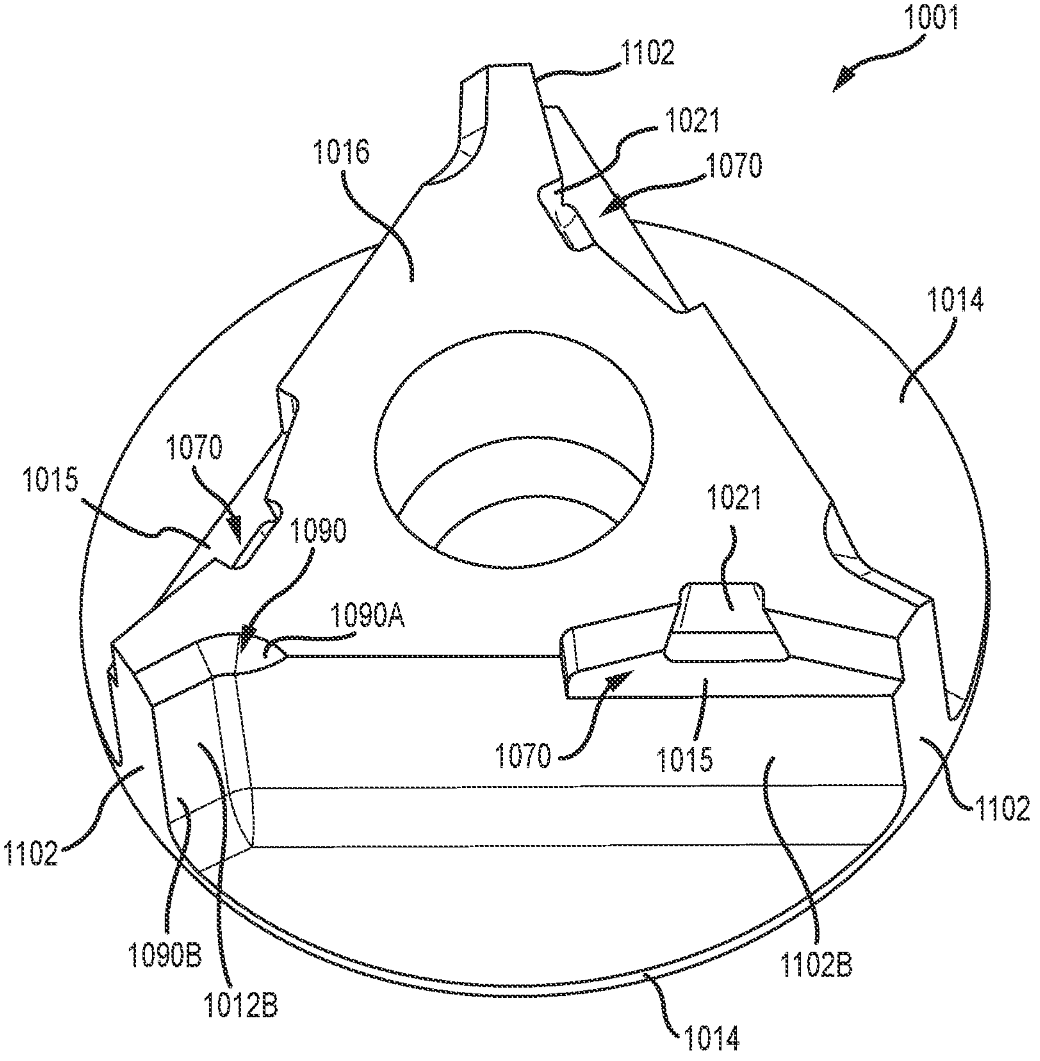
FIG. 6 shows a top, perspective view of the rotor of FIG. 5 without the hardened tips.
Figure 7:
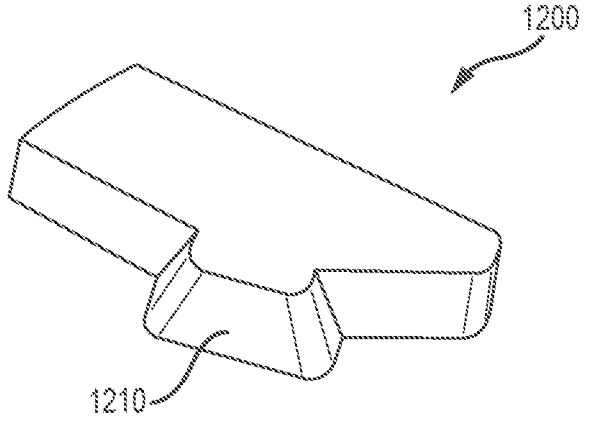
FIG. 7 shows a rear, perspective view of a hardened tip used with the rotor of FIG. 5.
Figure 8:
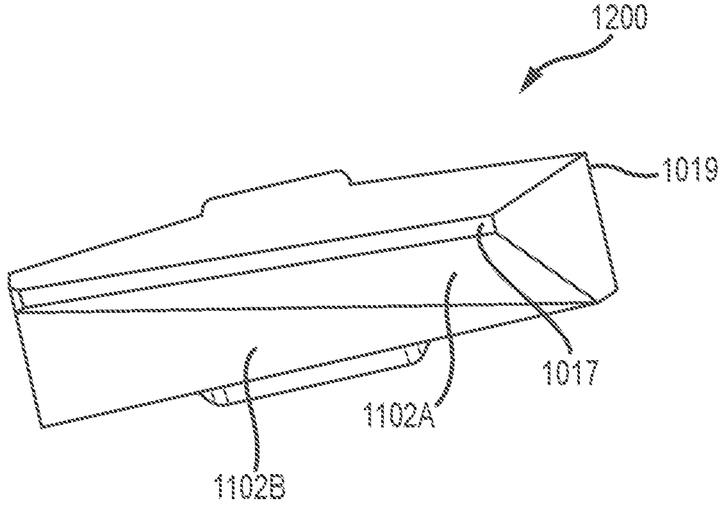
FIG. 8 shows a front, perspective view of a hardened tip used with the rotor of FIG. 5.

FIGS. 6-8 show body portion 1001 and hardened tips 1200, each of which as an extension 1210, prior to being assembled. In order to secure the tips 1200 to the body portion 1001, it is preferred that portions of the corners of each blade 1012 on body portion 1001 be cut out to create recesses or gaps 1015 and tips 1200 are designed to snuggly fill gaps 1015 when cemented in place. The mating of tips 1200 to gaps 1015 helps secure tips 1200 to body portion 1001 and alleviate the possibility that they will come apart during use. Any suitable method, however, for attaching hardened tips 1200 to rotor body portion 1001 may be used.

Additionally, as shown each gap 1070 has a channel 1015 and a back channel 1021 that mate with corresponding sections on each tip 1200 to help secure tips 1200 to rotor body 1001. The tips are preferably cemented in place.

Figure 9:
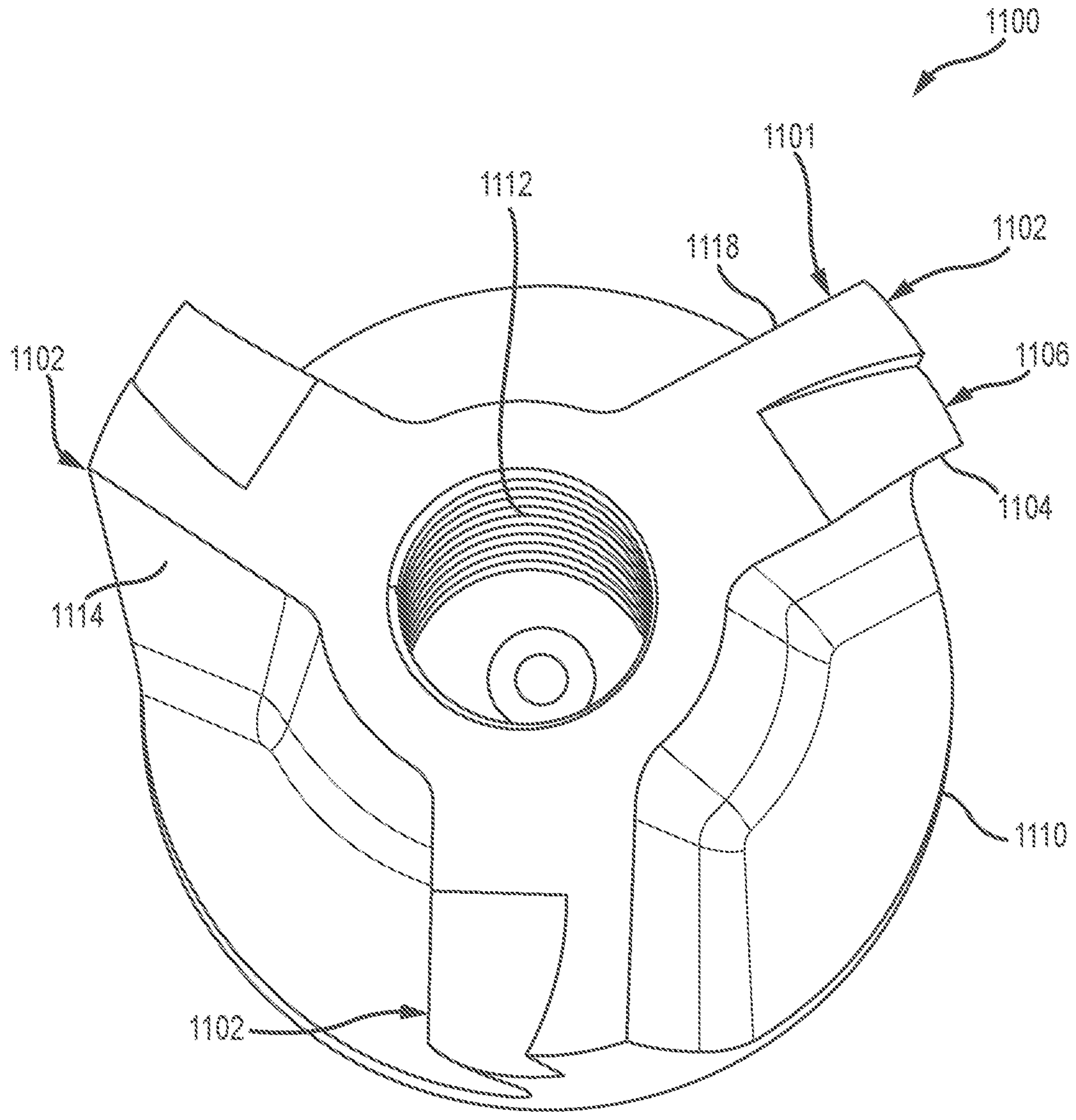
FIG. 9 shows a top view of a rotor according to aspects of the invention and having hardened tips of the structure shown in FIGS. 1-4B.
Figure 11:
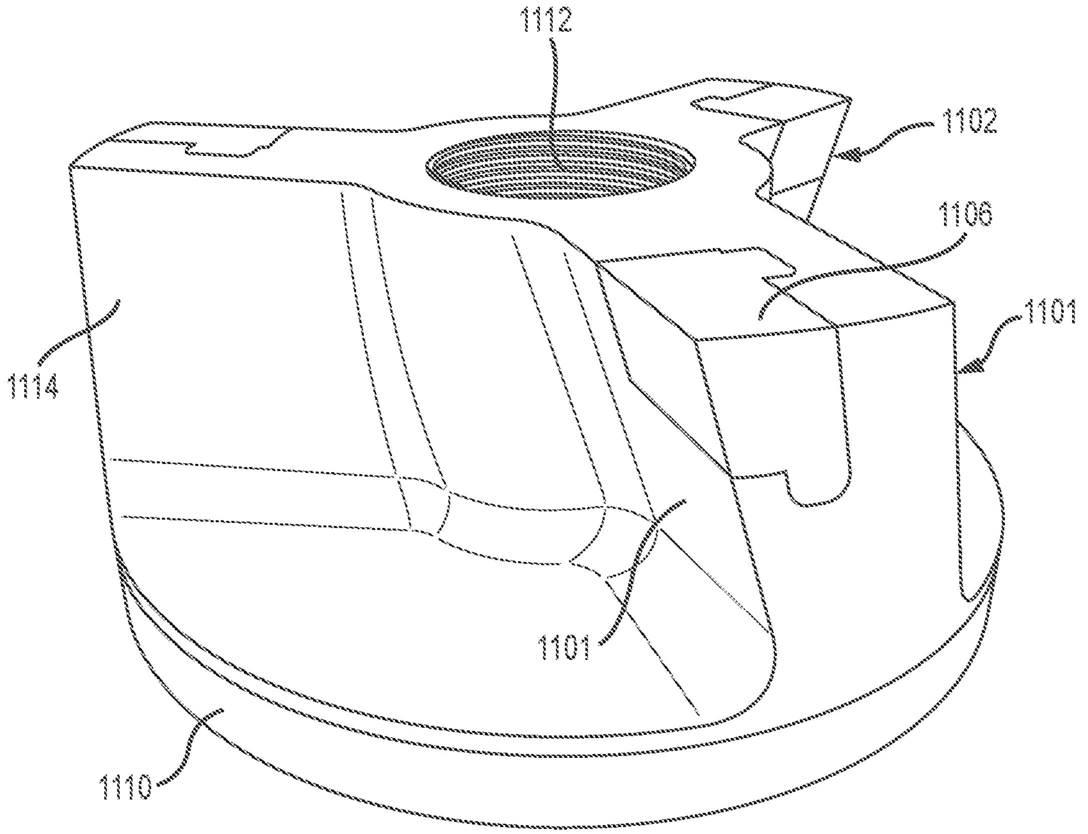
FIG. 11 is a side view of the rotor of FIG. 9.

FIGS. 9 and 11 show a rotor 1100 that has the same hardened tip design as rotor 10. Rotor 1100 has blades 1102. Each blade 1102 has a leading surface 1104, a hardened tip 1105, and a trailing surface 1108. Rotor 1100 also has a flow blocking plate 1110, a connective portion 1112, and a rotor body portion 1101, which as used throughout this specification for each embodiment is the body of the rotor that does not include the flow blocking plate, or bearing(s), and that is softer than the hardened tip(s).

Figure 9A:
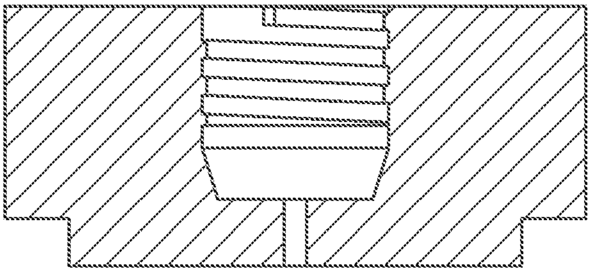
FIG. 9A shows a cross-sectional view of the rotor of FIG. 9.

FIG. 9A is a cross-sectional, side view of the rotor of FIG. 9.

Figure 10:
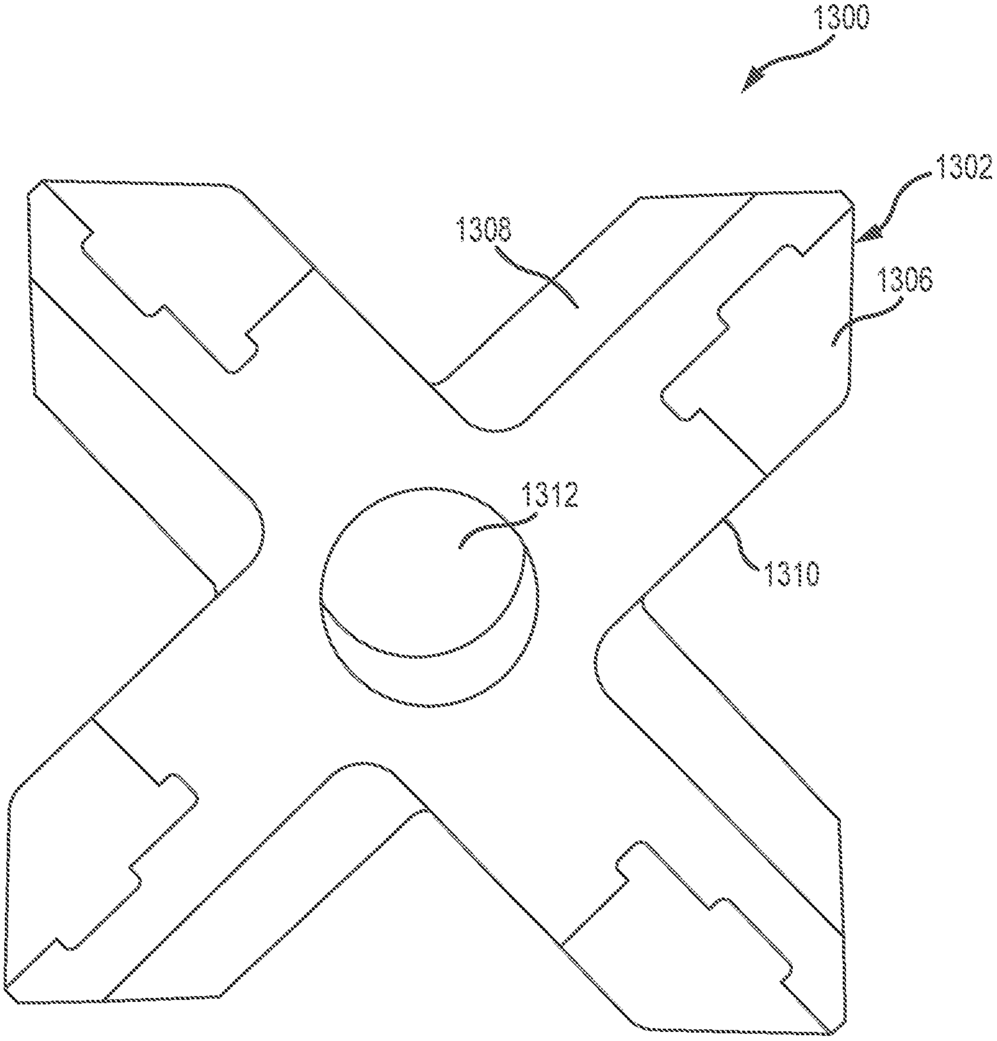
FIG. 10 shows an alternate rotor according to aspects of the invention and having hardened tips of the structure shown in FIGS. 5-8.
Figure 12:
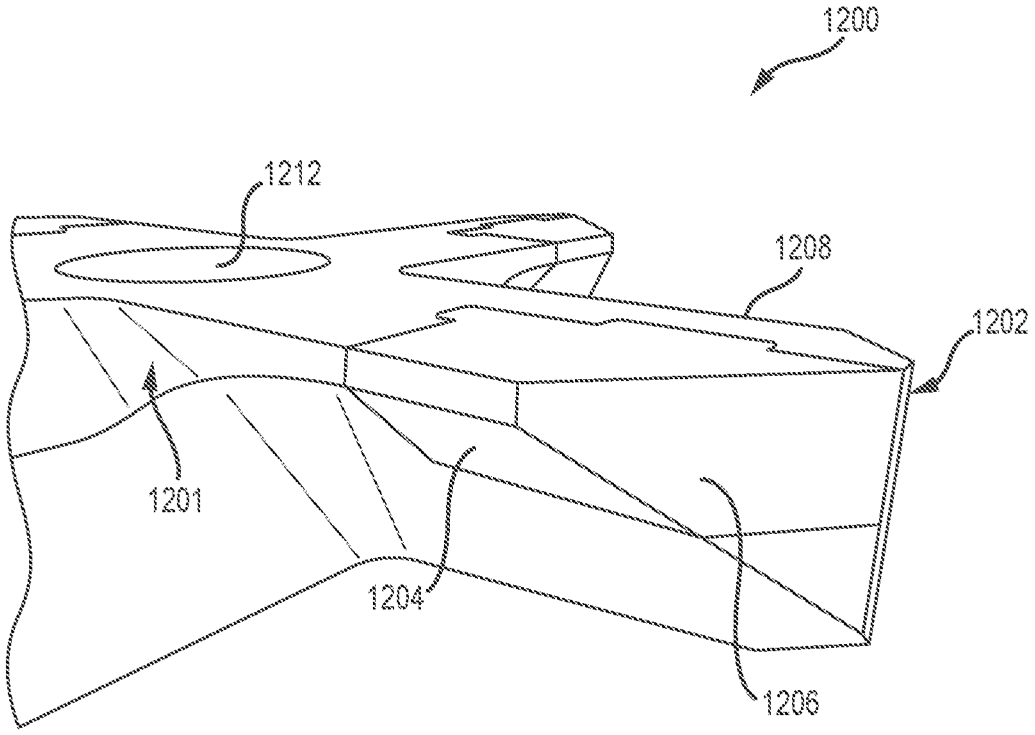
FIG. 12 is close-up, partial side view of the rotor of FIG. 10.

FIGS. 10 and 12 show a rotor 1200 that has the same hardened tip design as rotor 1000. Rotor 1200 has blades 1202. Each blade 1202 has a leading surface 1204, a hardened tip 1206, and a trailing surface 1208. Rotor 1200 also has a connective portion 1212, and a rotor body portion 1201.

Hardened tips may be utilized in any suitable rotor, such as the rotors described in U.S. Pat. Nos. 7,402,276, 8,178,037, 8,110,141, 8,409, 495, and 8,075,837.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A rotor for use in molten metal, the rotor comprising (a) a body portion, and (b) a plurality of rotor blades, wherein each rotor blade comprises (i) a leading edge on a leading surface, wherein the leading surface has a height, (ii) a trailing edge, (iii) a top surface between the leading edge and the trailing edge, and (iv) a separate hardened tip different from and not connected to a hardened tip on any of the other plurality of rotor blades and comprising material at least twice as hard as the body portion, wherein the hardened tip extends along the top surface 30%-50% of a distance between the leading edge and the trailing edge and 30%-50% of the leading edge.

2. The rotor of claim 1, wherein each separate hardened tip is comprised of material between 2-3 times, 2-4 times, or 2-5 times as hard as the body portion.

3. The rotor of claim 1, wherein each separate hardened tip is cemented to the body portion.

4. The rotor of claim 1, wherein each separate hardened tip is comprised of silicon carbide and the body portion is comprised of graphite.

5. The rotor of claim 1, wherein each rotor blade has a first portion and a second portion, and the first portion pushes the molten metal towards the second portion, and the second portion pushes the molten metal outward.

6. The rotor of claim 5, wherein each separate hardened tip forms at least part of the first portion.

7. The rotor of claim 6, wherein each separate hardened tip forms part of the second portion.

8. The rotor of claim 5, wherein each rotor blade includes a recess on the side opposite the first portion, each recess for enlarging an opening between each rotor blade to allow more molten metal to pass through the opening.

9. The rotor of claim 1, wherein the body portion has grooves formed in each rotor blade, wherein the grooves are configured to receive a corresponding extension of each hardened tip.

10. The rotor of claim 1, wherein the plurality of blades comprises three blades.

11. The rotor of claim 1 that further includes a connective portion configured to connect to a rotor shaft.

12. The rotor of claim 1 that further includes a flow-blocking plate at a bottom of the rotor.

13. The rotor of claim 1 that further includes a bearing surface comprised of ceramic.

14. The rotor of claim 5, wherein the first portion of each rotor blade has a horizontally-extending projection with a top and with a bottom.

15. The rotor of claim 5, wherein the second portion of each rotor blade is vertical.

16. The rotor of claim 14, wherein the bottom surface of each horizontally-extending projection is formed at a 10°-60° downward angle relative a horizontal axis.

17. The rotor of claim 14, wherein the horizontally-extending projection has the leading edge and the leading edge is at least ⅛" thick.

18. The rotor of claim 1, wherein each separate hardened tip extends along part of each leading surface.

19. The rotor of claim 1, wherein each rotor blade has an outermost edge and the separate hardened tip of each rotor blade extends along part of the outermost edge.

20. A molten metal pump including the rotor of claim 1.

* * * * *